US008428997B2

(12) United States Patent
Maga et al.

(10) Patent No.: US 8,428,997 B2
(45) Date of Patent: Apr. 23, 2013

(54) CUSTOMER PROFITABILITY AND VALUE ANALYSIS SYSTEM

(75) Inventors: Matteo Maga, Milan (IT); Paolo Canale, Rome (IT); Astrid Bohe, Kronberg (DE)

(73) Assignee: Accenture Global Services Limited, Dublin (IE)

( * ) Notice: Subject to any disclaimer, the term of this patent is extended or adjusted under 35 U.S.C. 154(b) by 1046 days.

(21) Appl. No.: 11/293,025

(22) Filed: Dec. 2, 2005

(65) Prior Publication Data

US 2007/0118419 A1 May 24, 2007

(30) Foreign Application Priority Data

Nov. 21, 2005 (EP) .................................. 05425820
Nov. 21, 2005 (IT) .............................. BS2005A0144

(51) Int. Cl.
*G06Q 30/00* (2006.01)
(52) U.S. Cl.
USPC ............................ 705/7.29; 700/36; 702/181
(58) Field of Classification Search ...................... 700/36
See application file for complete search history.

(56) References Cited

U.S. PATENT DOCUMENTS

| | | | |
|---|---|---|---|
| 6,167,396 A | 12/2000 | Lokken | |
| 6,240,411 B1 | 5/2001 | Thearling | |
| 6,925,441 B1 * | 8/2005 | Jones et al. | 705/7.33 |
| 6,950,407 B1 * | 9/2005 | Huddle | 370/254 |
| 6,968,316 B1 * | 11/2005 | Hamilton | 705/36 R |
| 6,996,093 B2 * | 2/2006 | Dalton et al. | 370/356 |
| 7,376,603 B1 * | 5/2008 | Mayr et al. | 705/35 |
| 7,664,782 B2 * | 2/2010 | Iba | 707/803 |

(Continued)

FOREIGN PATENT DOCUMENTS

| | | |
|---|---|---|
| WO | WO 00/34910 A2 | 6/2000 |
| WO | WO 01/29692 A2 | 4/2001 |
| WO | WO 01/93158 A1 | 12/2001 |

OTHER PUBLICATIONS

Raaij, Erik_Vernooij, Maarten_Triest, Sander, The Implementation of customer profitability analysis:, 2003, a case study, Industrial Marketing Management pp. 573-583.*

(Continued)

*Primary Examiner* — Jonathan G Sterrett
*Assistant Examiner* — Stephen S Swartz
(74) *Attorney, Agent, or Firm* — Brinks Hofer Gilson & Lione

(57) ABSTRACT

Systems and methods are provided for analyzing a business's profitability. A system for analyzing customer profitability includes an interface for receiving customer, revenue and cost data from external business operating systems. Customer, revenue, and cost data are stored on a database. A data transformation module operates on the customer data, allocating revenue and costs to individual customers. A customer profitability engine calculates the profitability of customers based on the allocated revenue and cost data. A report module generates reports illustrating the profitability results and other key performance indicators. Optionally, an average customer lifetime value may be calculated based on the customer profitability results. A method for analyzing customer profitability includes identifying sources of revenue, identifying sources of costs, and establishing rules for allocating revenue and costs to individual customers. The method further includes receiving actual customer, revenue and cost data and allocating revenue and costs to individual customers according to the allocation rules. Customer profitability and KPI values are calculated for individual customers and reports are generated illustrating the profitability results and various KPIs for individual customers or groups of customers sharing a common characteristic.

27 Claims, 18 Drawing Sheets

U.S. PATENT DOCUMENTS

| | | | |
|---|---|---|---|
| 7,698,398 B1* | 4/2010 | Lai | 709/223 |
| 7,831,693 B2* | 11/2010 | Lai | 709/220 |
| 2003/0018503 A1* | 1/2003 | Shulman | 705/7 |
| 2004/0039593 A1 | 2/2004 | Eskandari | |
| 2004/0054690 A1* | 3/2004 | Hillerbrand et al. | 707/104.1 |
| 2004/0103051 A1 | 5/2004 | Reed et al. | |
| 2004/0186762 A1* | 9/2004 | Beaven et al. | 705/8 |
| 2004/0186765 A1* | 9/2004 | Kataoka | 705/10 |
| 2005/0021433 A1* | 1/2005 | Hyler | 705/36 |
| 2005/0091071 A1* | 4/2005 | Lee | 705/1 |
| 2005/0177598 A1 | 8/2005 | Hao et al. | |
| 2005/0203768 A1 | 9/2005 | Florance et al. | |
| 2005/0226400 A1* | 10/2005 | Farber et al. | 379/114.01 |
| 2006/0129447 A1* | 6/2006 | Dockery et al. | 705/10 |
| 2006/0240822 A1* | 10/2006 | Jiang | 455/433 |
| 2006/0259364 A1* | 11/2006 | Strock et al. | 705/14 |
| 2006/0282432 A1* | 12/2006 | Cassidy et al. | 707/7 |
| 2007/0033127 A1* | 2/2007 | Masuyama et al. | 705/36 R |
| 2007/0260498 A1* | 11/2007 | Yokota et al. | 705/7 |

OTHER PUBLICATIONS

United States Patent and Trademark Office Action dated Mar. 18, 2010 for co-pending U.S. Appl. No. 11/291,439.

United States Patent and Trademark Office Action dated Nov. 24, 2009 for co-pending U.S. Appl. No. 11/292,843.

Extended Search Report for co-pending European Patent Application No. 08170874.5 dated Sep. 10, 2009.

Chaudhuri S. et al., "An Overview of Data Warehousing and OLAP Technology," SIGMOD Record, ACM, New York, New York, vol. 26, No. 1, Mar. 1, 1997, pp. 65-74, XP002193792 ISSN: 0163-5808.

United States Patent and Trademark Office Action dated Jul. 23, 2009 for co-pending U.S. Appl. No. 11/291,438.

United States Patent and Trademark Office Action dated Jan. 21, 2010 for co-pending U.S. Appl. No. 11/291,438.

Kleissner, Charly, "Data Mining for the Enterprise," IEEE Proceedings 31$^{st}$ Annual Hawaii International Conference on System Sciences, Copyright 1998, pp. 295-304.

Mitchell, Tom M., "Machine Learning and Data Mining", Communications of the Association for Computing Machinery (ACM), Nov. 1999/ vol. 42 No. 11, Copyright 1999, pp. 30-36.

Nadinic, Berislav, "New Possibilities for Knowledge Discovery in Telecommunication Companies," 8$^{TH}$ International Conference on Telecommunications—ConTel 2005, Jun. 15-17, 2005, Zagreb, Croatia, pp. 259-263.

Pedro R. Falcone Sampaio et al.: "Business Process Design and Implementation for Customer Segmentation e-Services" Proceedings of the 2005 IEEE International Conference on E-Technology, E-Commerce and E-Service, EEE-05, Hong Kong, China, Mar. 29-Apr. 1, 2005, Copyright 2005, pp. 228-234, including Table of Contents pp. v-xiv.

Richard J. Roiger et al., "A Majority Rules Approach to Data Mining," Proceedings of International Conference on Intelligent and Cooperative Information Systems, Copyright 1997, pp. 100-107.

Office Action dated Apr. 2, 2010 for Italian Patent Application No. BS2005A000136.

Office Action dated Apr. 2, 2010 for Italian Patent Application No. BS2005A000144.

United States Patent and Trademark Office Action dated May 26, 2010 for co-pending U.S. Appl. No. 11/292,483.

Terplan, Kornel, "OSS Essentials: Support System Solutions for Service Providers," 7601010 Advanced Course in Network Based Automation, Dec. 1, 2003 http://www.ac.tut.fi/aci/courses/7601010/2003/esitykset/7.4%20-%207.5.pdf.

Teegerstrom, Trent and Tronstad, Russel, "Overview of Ranch Financial Analysis Spreadsheet," Ranch Business Management, 2001 http://ag.arizona.edu/AREC/pubs/rmg/6%20ranchbusinessmanagement/56%20ranchfinancialspreadsheet01.pdf.

* cited by examiner

```
                Call Center          Login page   Main page  ? Help

Customer Profitability
    SAC Subscriber         Call Center Display
      Acquisition           This page displays the Customer Profitability Call Center information: the
    SRC Subscriber          segment, contact reason, amount and period (start and end date).
      Retention
    Customer Care
      Call Center
      Technical Support    To add a new item click on the ADD button.
      Service Inquires     To modify/ delete an existing item click on the corresponding Edit buttons.
    Bureau Services
    Usage
      Access Reports          Call Center Grid
      KPI                  No.  Segment     Contact Reason      Amount   Start Date    End Date
      Logs                  1  RESIDENTIAL  Nav product purchase  204    01/01/2001    31/12/2003  Edit
                            2  RESIDENTIAL  General Information   102    01/01/2001    31/12/2003  Edit
                            3  Business     General Information  1232    01/01/2001    31/12/2003  Edit
  ADMINISTRATOR             4  RESIDENTIAL  Bill Inquiry          198    01/01/2001    31/12/2003  Edit
  Logged As  |   ACS1       5  RESIDENTIAL  Technical Problem     289    01/01/2001    31/12/2003  Edit
  Last Login |  25/10/2004  6  Business     Nav product purchase  232    01/01/2001    31/12/2003  Edit
                            7  Business     Bill Inquiry          243    01/01/2001    31/12/2003  Edit
                            8  Business     Bill Inquiry now      300    01/01/2001    31/12/2003  Edit
```

Fig.8

```
                Call Center          Login page   Main page  ? Help

Customer Profitability
    SAC Subscriber         Call Center Modify / Delete
      Acquisition           This page allows you to modify / delete a Call Center entry in the Customer
    SRC Subscriber          Profitability application. The information to edit is: the segment, contact reason,
      Retention             amount and period (start and end date). Once modified / deleted, the page with all
    Customer Care           call center entries, including the recent changes, are displayed.
      Call Center
      Technical Support
      Service Inquires     All Fields are mandatory.
    Bureau Services
    Usage
      Access Reports          Call Center Entry Form
      KPI                  Segment:         RESIDENTIAL
      Logs                 Contact Reason:  New product purchase
                           Amount:          204
  ADMINISTRATOR            Start Date:      01/01/2001
  Logged As  |   ACS1      End Date:        21/12/2003
  Last Login |  25/10/2004
                                          [Modify] [Delete] [Clear] [Cancel]
```

Fig.9

| No. | ID | Name | Description |
|---|---|---|---|
| 1 | R01 | Fixed Fees | All fees applied to subscriber once. |
| 2 | R02 | Recurring Charges | Revenue applied to subscriber once. |
| 3 | R03 | Revenue by Usage | Revenue items related to network usage. |
| 4 | R06 | Positive Adjustment | Technical adjustments assigned to subscriber. |

KPI ARPU Items Detail Grid

|  | Big Spenders | Casual Callers | Heavy Talkers | Moderate Chatters | Safety Users |
|---|---|---|---|---|---|
| 0% | €2,254.56 | €638.69 | €10,560.36 | €8.05 | -€43.67 |
| 10% | -€475.10 | €132.69 | -€371.11 | -€35.09 | -€21.77 |
| 20% | €389.40 | -€295.69 | -€734.56 | -€29.26 | -€4.94 |
| 30% | €0.00 | €67.49 |  | -€22.66 | €0.78 |
| 40% | €0.00 | -€10.18 | €0.00 | -€43.68 | -€0.67 |
| 50% | €0.00 | €164.44 |  | -€25.44 | €1.26 |
| 60% | €0.00 | €20.09 |  | -€147.98 | -€3.72 |
| 70% |  | €14.00 |  | -€28.74 | -€0.30 |
| 80% | €0.00 | €24.75 |  | -€124.75 | €1.29 |
| 90% |  | -€83.64 |  | -€136.00 | €6.58 |

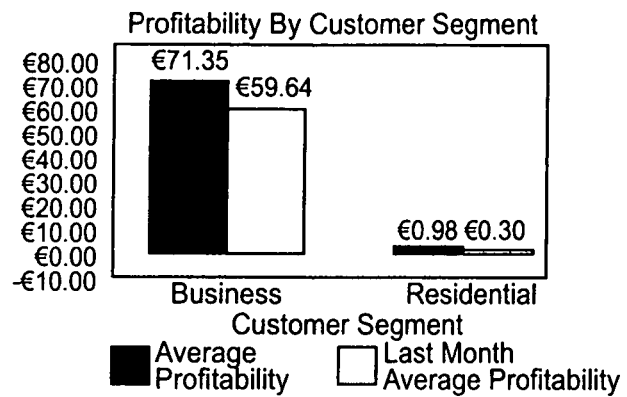
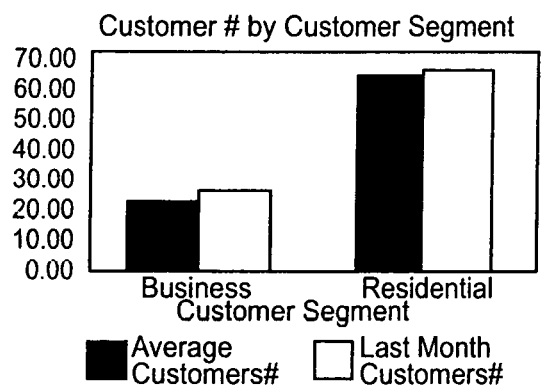
Fig.22

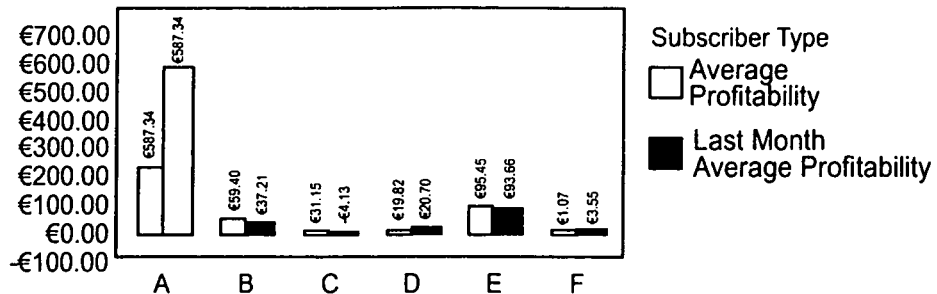
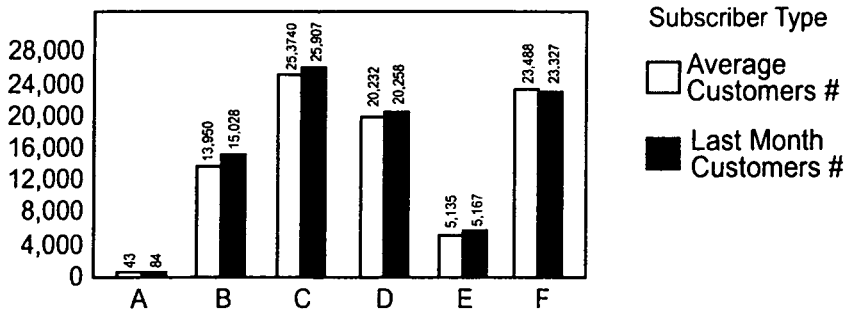
Fig. 24
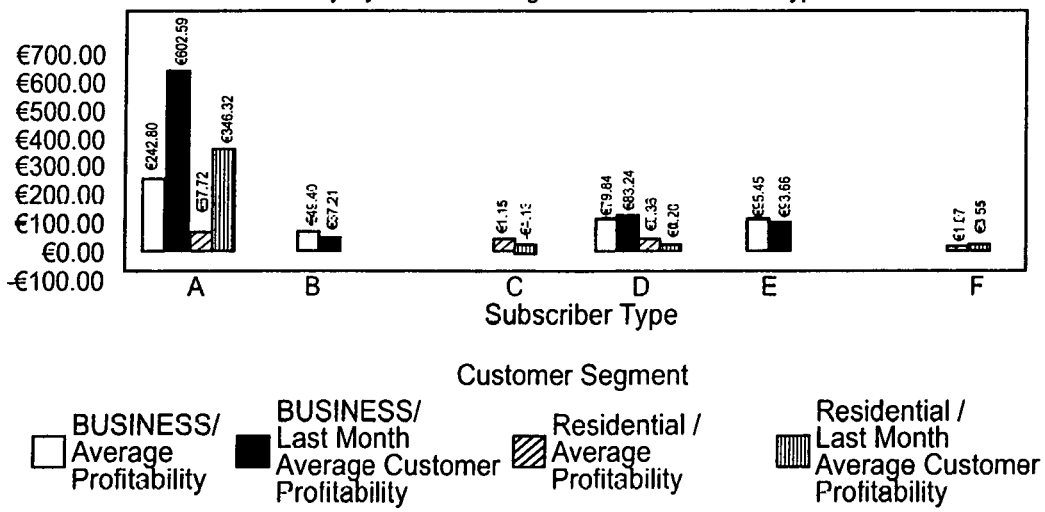
Fig. 25

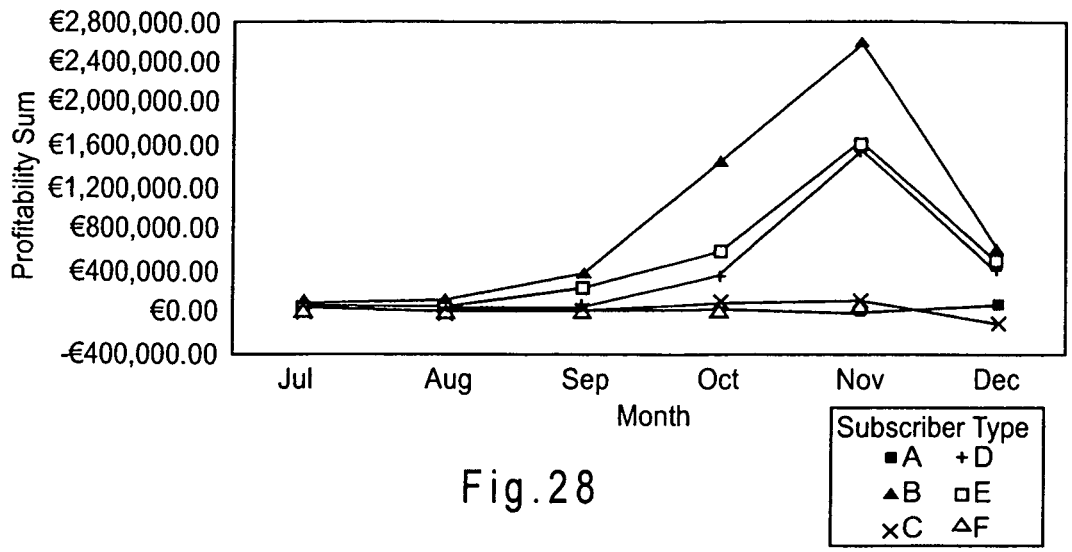
Fig. 28
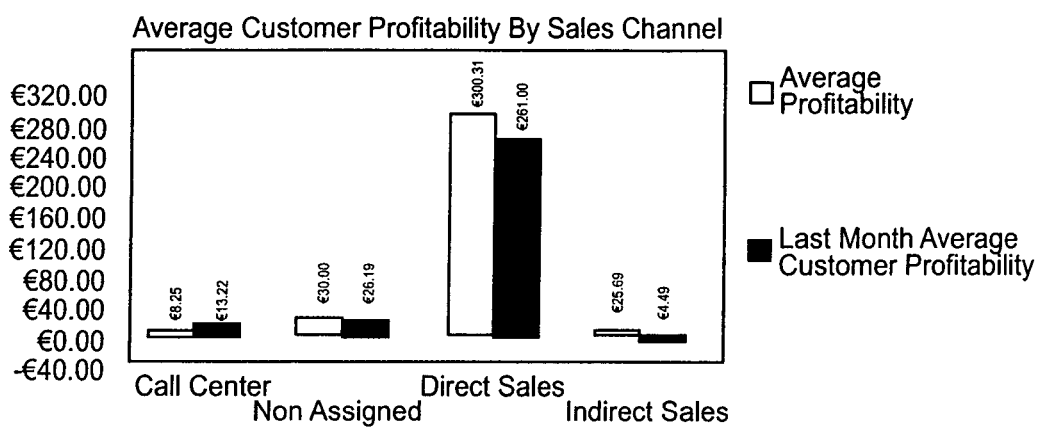
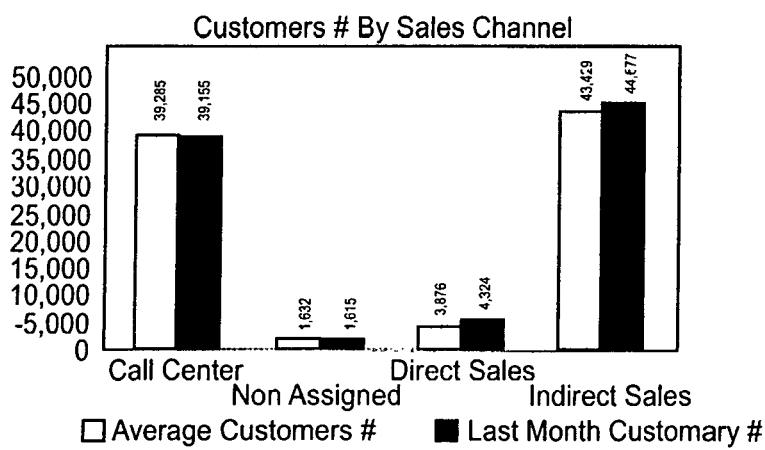
Fig. 29

CUSTOMER PROFITABILITY AND VALUE ANALYSIS SYSTEM

PRIORITY CLAIM

This application claims the priority benefit of EPO Application No. EPO05425820 filed Nov. 11, 2005, and Italian Application No. BS2005A000144 filed Nov. 21, 2005, both of which are incorporated herein by reference in their entirety.

BACKGROUND

1. Technical Field

The present invention relates to systems and methods for analyzing a business's profitability on a customer-by-customer basis.

2. Background Information

Profit is the fundamental measure of a business's success. Improving profits is the key to improving business performance. Most businesses monitor profits based on the products or services they sell. Under this model profits are calculated by subtracting the costs associated with producing and distributing a product, or providing a service, from the revenue generated by the sale of the product or service. Underperforming products or services are easily identified by their low profitability. Once under performing products or services are identified, steps may be taken to improve their performance. For example, the price of a product or service may be raised in order to increase revenue, or production or delivery processes may be improved to maximize efficiencies and reduce costs. Alternatively, poorly performing products and services may simply be discontinued, leaving the business to concentrate its efforts on more profitable ventures.

Analyzing the profits generated by individual products and services, however, only provides a portion of the overall profitability picture. Products and services are consumed by customers. For numerous and varied reasons some customers may be more profitable than others. For example, a company in the business of providing telecommunications services may have several different types of customers. Some may be business customers and some may be residential customers, some may be heavy talkers who use their telephones often, while others rarely use their phones at all. Still others may be moderate chatters falling somewhere inbetween. Furthermore, different customers may subscribe to different service plans. Some may pay for large blocks of minutes each month, while others may purchase smaller blocks of access time but are required to pay additional fees if they go over their allotted time. Some customers may purchase pre-paid phone cards, while others are billed for their usage at the end of each month. All of these factors and more may contribute to the overall profitability of individual customers such that some customers are more profitable than others.

Due to the large number of variables involved, it is not easy to predict or determine which customers will be the most profitable. Often the answer is not intuitive. For example, heavy talkers may pay higher monthly fees for more minutes of access each month than do moderate chatters. Thus, one might be led to believe that heavy talkers would be more profitable than moderate chatters. However, heavy talkers may initiate many more calls to parties outside the service provider's network, incurring termination fees that must be paid to other telecommunications service providers. These additional fees are costs that reduce profits to the point where heavy talkers may be less profitable than moderate chatters. This is useful information for the telecommunications service provider to know. Steps taken to increase usage by customers who rarely use their phones may have a more significant impact on overall profitability than efforts to increase the usage of moderate chatterers. Such business intelligence provides a clear direction for future marketing campaigns.

Analyzing the profitability of individual customers and groups of customers can provide valuable business intelligence to a telecommunications service provider or operators of other types of businesses. Knowing who a business's most profitable customers are, and who are the least profitable allows an organization to allocate marketing, sales, product development and customer service efforts and resources according to the potential value provided by individual customers or classes of customers.

Heretofore the complexities of allocating heterogeneous costs and revenues to individual customers have prevented businesses from determining the profitability and value of individual customers within the business's customer base. The lack of such systems has prevented businesses from organizing their customer relationship efforts on an individual customer value basis. When data identifying customers who are the most profitable and those who not are available, almost every aspect of the customer relationship can be refocused. Businesses can identify which customers must be given the highest priority in order to retain high profit customers. Likewise, businesses can determine which customers are the least profitable and who are not worth extensive customer service efforts to keep satisfied. When combined with various customer attribute data such as service plans, type of customer, market segment, and the like, the insights into the sources of profitability can be enlightening and profound.

BRIEF SUMMARY

The present invention provides systems and methods for analyzing customer profitability on a customer-by-customer bases. According the invention the sources of a business's costs and revenues are defined. Rules are established for allocating the revenue and costs to the business's individual customers. Customer, cost and revenue data are received from the business's operating systems and profitability is analyzed based on the profitability of individual customers. First, the revenue and cost data are allocated to individual customers based on the established allocation rules. Once the revenue and costs have been allocated, the profitability for individual customers is calculated by subtracting the costs allocated to a customer from the revenue allocated to the customer. Additional key performance indicators (KPIs) may be defined and calculated based on the revenue and cost data as well as the profitability results. Finally, reports are generated for displaying the profitability results. The results may be presented in multiple different ways. Reports may compare and contrast the profitability results and KPIs for different customer segments, market segments, profitability tiers, geographical regions, different products or service packages, different sales channels and so forth.

According to an embodiment of the invention a computer based system for analyzing profitability is provided. The system includes a database adapted to receive and store various data including customer data, revenue data and cost data. An interface is provided for receiving the customer data, revenue data and cost data from one or more external business operating systems for storage in the database. A data transformation module associated with the database is adapted to operate on the customer data, cost data and revenue data received from the one or more business operating systems. The data transformation module includes instructions for allocating costs and revenue to individual customers according to predefined allocation rules. The transformed data are again stored in the database. A customer profitability module is provided and is adapted to operate on the transformed customer data, cost data and revenue data. The customer profitability engine calculates the customer profitability of individual customers, based on the costs and revenue allocated to the customers, and calculates KPIs derived from the customer, cost and revenue data. Finally, a report module is provided for generating reports illustrating the customer profitability and the various KPIs. Multiple different KPIs and customer attributes may be selected in order to display data from many different vantage points, offering a flexible, insightful view of customer profitability.

According to another aspect of the invention a method of analyzing profitability is provided. The method is intended to be implemented in a business systems environment in which a customer profitability data mart is interfaced with business operating systems including a customer billing system, a customer relationship management system, and accounting systems. The systems environment further includes a graphical user interface for accessing data in the data mart and defining KPIs. A report module is provided for generating reports based on data stored in the data mart. The predefined reports analyze the business's profitability from a customer-by-customer perspective. The method involves receiving customer, revenue and cost data from the business operating systems interfaced with the data mart and storing the received data in the data mart. The received revenue and cost data are allocated to individual customers according to predefined allocation rules. Customer profitability and KPIs are calculated for individual customers from the revenue and cost data allocated to the individual customers. The profitability results and KPIs are then used to populate reports that are produced for purposes of analyzing customer profitability results. Optionally, an average customer lifetime value may be calculated for statistically significant customer populations. The customer lifetime value calculations may be run again and again with different input parameters in order to test how various changes in operating conditions or profitability performance may impact customer value and long term profitability.

Finally, according to another aspect of the invention, a method of analyzing customer profitability involves identifying sources of revenue, identifying sources of costs, and establishing rules for allocating the revenue and costs to individual customers. The method further involves receiving customer, revenue and cost data. Typically these data will be collected from external business operating systems. Next, the received revenue and cost data are allocated to individual customers according to the established allocation rules. Customer profitability and key performance indicators are calculated for individual customers. The customer profitability is calculated based on the revenue and cost data allocated to each customer. The KPIs are derived from various combinations of the revenue and cost data. Finally, one or more reports are generated displaying various combinations of profitability results and KPIs.

BRIEF DESCRIPTION OF THE DRAWINGS

FIG. 8 is a GUI intranet web page displaying call center data;

FIG. 9 is a GUI intranet web page displaying a call center record modify/delete page;

FIG. 14 is a GUI intranet web page providing access to customer execution profitability logs by date of execution and/or by customer;

FIG. 15 is a GUI intranet page showing Access Reports Display;

FIG. 22 is a sample report illustrating the distribution of both profitability and customers per market segment;

FIG. 24 is a sample report illustrating profitability by subscriber type and the distribution of customers by subscriber type;

FIG. 25 is a sample report showing profitability by market segment and subscriber type;

FIG. 28 is a sample report illustrating the profitability trend by subscriber type over a six month period;

FIG. 29 is a sample report illustrating average profitability by sales channel and the customer distribution amongst the different sales channels;

DETAILED DESCRIPTION OF THE DRAWINGS AND THE PRESENTLY PREFERRED EMBODIMENTS

The present invention relates to customer focused systems and methods for analyzing a business's profits. The systems and methods of the invention glean business intelligence from operating data that may be used to improve a business's profit performance. The systems and methods allow a business to identify its most profitable customers and identify characteristics of both profitable and non-profitable customers alike. Such analysis can assist the business with strategic decision making and resource allocation in order to improve overall profitability. Business goals supported by such a customer-centric profitability analysis include optimizing profits from existing customers, retaining profitable customers, and increasing the ranks of a business's most profitable customers.

Analyzing profitability from a customer-centric point of view poses a number of significant technical challenges. In order to perform the most wide ranging and thorough analysis possible, it is necessary gather copious amounts of data from widely disparate sources. Furthermore, the data must be manipulated and stored in a manner such the data may be substantially instantly aggregated or individualized or segmented as necessary according to the requirements of a user, and the substantially instantly aggregated, individualized or segmented data must be presented to a user in a coherent form. This requires interfaces, data structures, and processing modules which, until the present invention, were unavailable to those of ordinary skill in the art who would build and use such a business intelligence system. Furthermore, such a system must implement and execute sophisticated revenue and cost allocation rules previously unknown in the industry. Only when the necessary data are collected and stored in an appropriate manner can the revenue and cost data, and thus the profitability data associated with individual customers, be thoroughly and efficiently analyzed for a substantial customer base. Similarly, only when the appropriate data are properly analyzed and stored may they be effectively accessed to meet the online analytical processing requirements of a user seeking to probe the profitability data from multiple perspectives. For this, a novel reporting module capable of identifying and retrieving the necessary data and displaying the data in various report formats "on-the-fly" is required. Combining these elements in the unique manner of the present invention provides a complete end-to-end business intelligence system for analyzing customer profitability.

Figure 1:
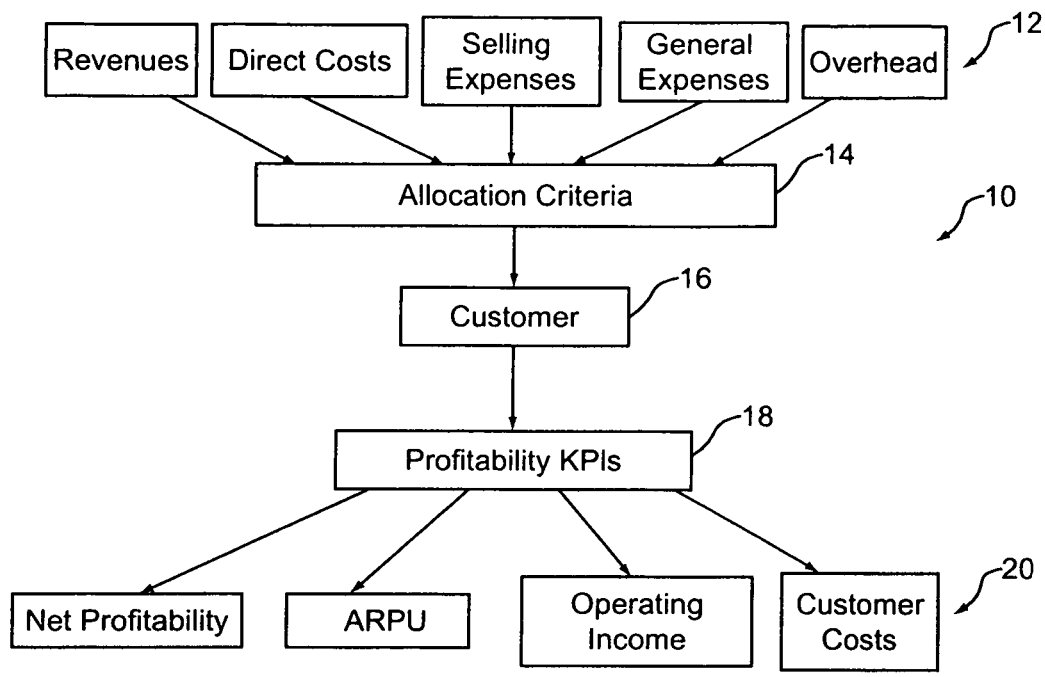
FIG. 1 is a block diagram showing the conceptual framework of a business intelligence system focused on customer profitability.

FIG. 1 is a block diagram 10 showing the conceptual framework of a business intelligence system focused on customer profitability. A data input layer 12 is provided to receive and store all revenue and cost data from the business's ongoing operations. Sophisticated allocation criteria 14 are established to allocate heterogeneous revenues and costs to individual customers 16. The individual customer 16 is the focus of the customer profitability analysis. Significant insights into a business's customer base and its sources of profits may be obtained by determining customer profitability on a customer-by-customer basis. Key performance indicators (KPIs) relating to customer profitability are generated from the customer profitability data in the Profitability KPI layer 18. An output layer 20 provides sophisticated analysis of the business's profitability. The various KPIs can be analyzed from multiple perspectives, including individual customer profitability, aggregate profitability, or the profitability of various customer segments. Not only profitability, but all of the factors that contribute to profitability can be analyzed from multiple perspectives.

Figure 2:
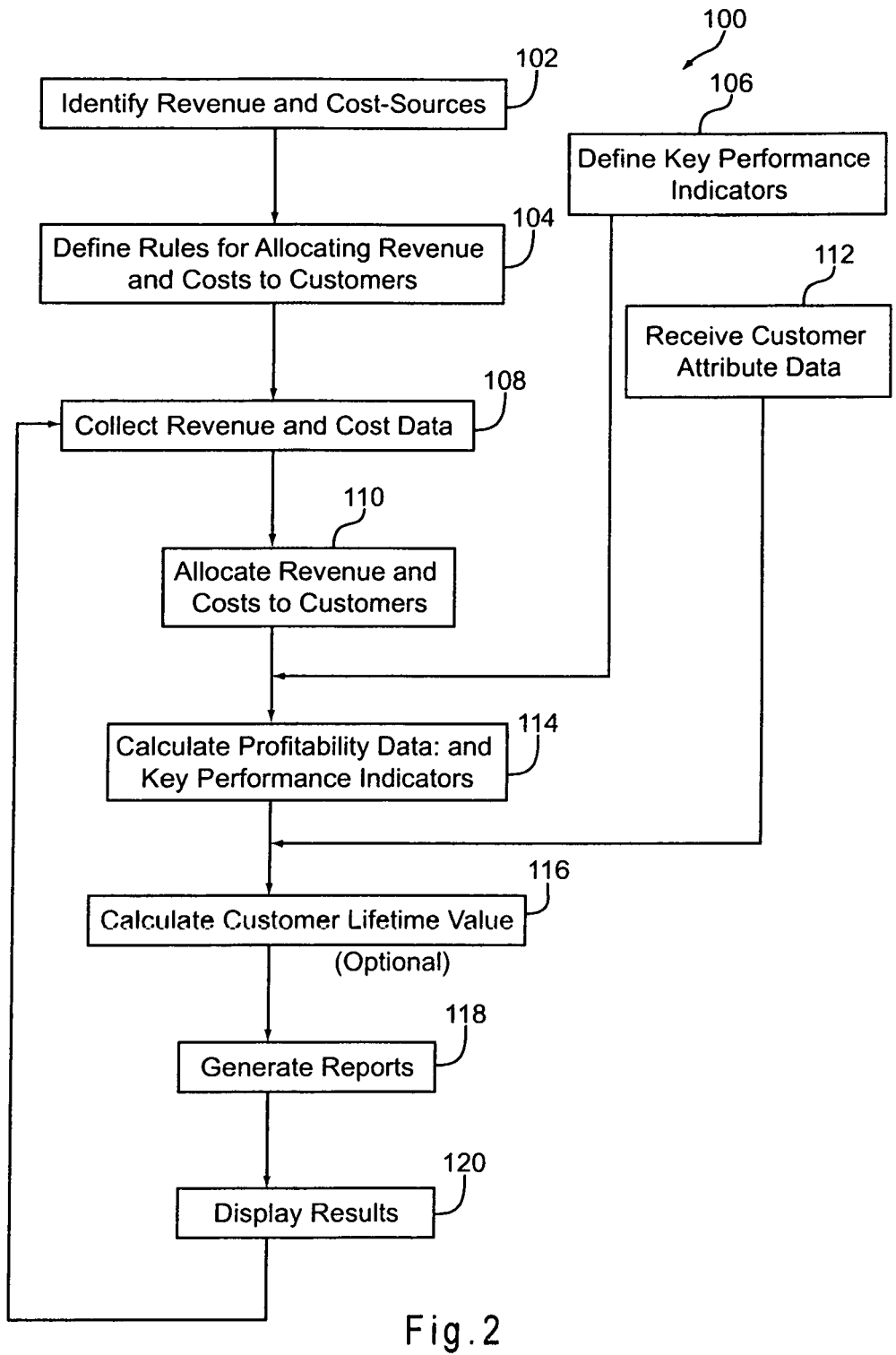
FIG. 2 is a flow chart of a method of analyzing customer profitability according to the invention.

FIG. 2 shows a flow chart 100 of a method of analyzing a business's profitability according to an embodiment of the invention. An initial requirement is to identify all sources of revenue and costs as shown at 102. Once the sources of revenue and costs are identified rules for allocating revenue and costs to individual customers must be established as indicated at 104. A final preparatory activity is to define key performance indicators (KPIs) as indicated at 106. The KPIs may include each element of revenue and cost that contribute to profitability, as well as various combinations of the cost and revenue items and values derived therefrom. Since the focus is on customer profitability, profitability (revenue−costs) is prominent among the key performance indicators. The KPIs give insight into the sources of profits, the value of individual customers, and the value of various classes of customers. Once the revenue and cost sources have been identified, the allocation rules established, and the KPIs defined, the business's profitability may be analyzed on an ongoing basis.

Revenue and cost data are collected at 108. Once the revenue and cost data are collected they are allocated to individual customers at 110. The allocation of the revenue and costs is conducted in accordance with the allocation rules established at 104. The profitability values and KPIs are then calculated at 114. Optionally a customer lifetime value (CLV) may be calculated at 116. The CLV provides an estimate of the net present value of the profits that will be generated from a relationship with a customer over the expected life of the relationship. The CLV uses statistical modeling and past results to predict the behavior of customers in the future. Accordingly, a statistically significant customer sample must be defined prior to the CLV calculation. Customer attribute data are received at 112. Customer segments and sub-segments may be defined based on customers having common attributes. The CLV calculations may be performed for customers in various customer segments. Sequentially, the timing of the customer data collection is unimportant. The only requirement is that the data must be collected before the various customer segments can be defined and the CLV calculated.

In any case, whether the CLV is calculated at 116 or not, the results of the profitability analysis are compiled into reports at 118. Many of the most useful and enlightening reports will display the customer profitability and other KPIs against one another for various customer segments. The various criteria for dissecting the customer population may be obtained from the customer data received at 112. Finally, the reports are displayed for a business intelligence consumer at 120.

Figure 3:
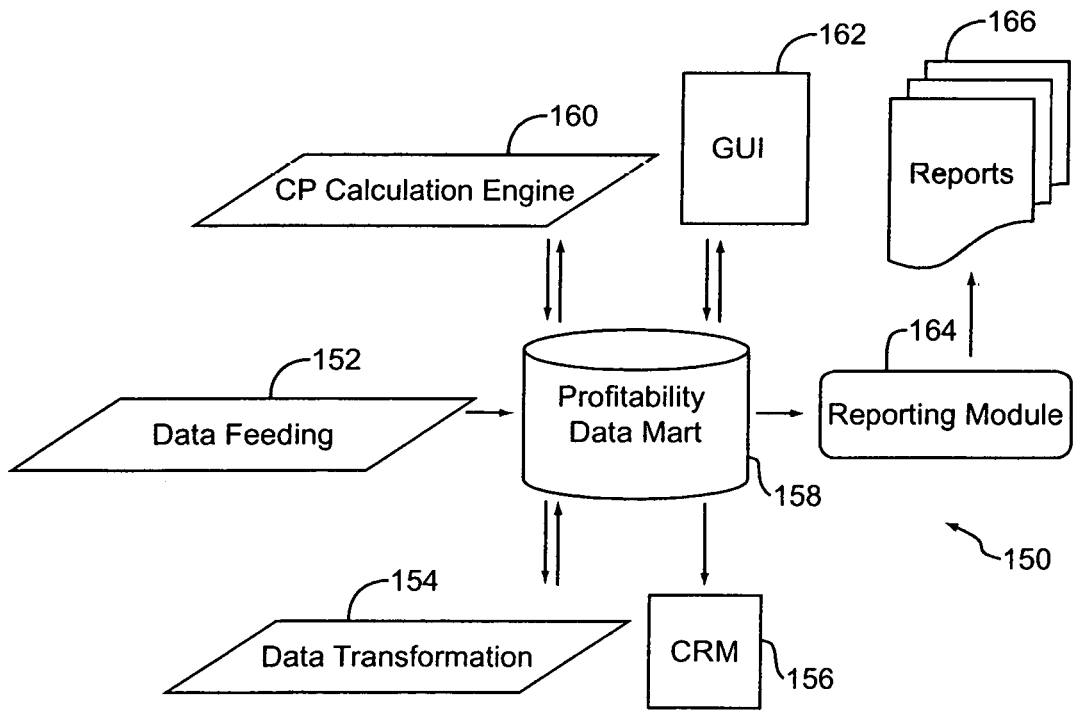
FIG. 3 is a block diagram of an embodiment of a customer profitability analysis system according to the invention.

FIG. 3 is a block diagram of a system 150 for analyzing a business's profitability according to an embodiment of the invention. At the heart of the system is a profitability data mart 158. The profitability data mart 158 is an optimized database configured to store all of the customer data, revenue data, cost data, and operational data necessary to calculate the profitability of individual customers and to generate the desired reports. The profitability data mart data structure is highly summarized and indexed, and the data stored in the profitability data mart 158 are optimized for fast access and analytical reporting.

Data are received by the Data Mart 158 via a data feeding module 152. The data feeding module operates as an interface to the business's various external operating systems, such as the accounting systems, billing/invoice systems, marketing systems, customer relationship management systems, and other operating systems in which customer, cost and revenue data are generated. The data feeding module 152 defines the data to be extracted from the external systems and forces the external systems to supply the data in a format consistent with storage and indexing requirements of the data mart 158. The raw data received from the data feeding module 152 include all customer data, revenue data, and cost data necessary to perform the customer profitability analysis and generate the desired reports.

A data transformation module 154 implements the revenue and cost allocation rules. The data transformation module 154 accesses the customer, revenue, and cost data stored in the data mart 158 and processes the received data, assigning costs and revenue to individual customers on a customer-by-customer basis. The transformed data are also stored in the data mart 158.

A customer profitability engine 160 operates on the transformed data and calculates the profitability of customers individually and calculates the KPIs. Again the data output from the customer profitability engine 160 are stored in the data mart 158.

A graphical user interface (GUI) 162 provides user access to the data mart 158. The GUI 162 allows a user to create, modify, and delete KPI records, and selectively view profitability and KPI values stored in the data mart 158. Through the User Interface, the profitability data mart may be explored by predefined KPI, customer ID, customer segment and time (by month). The GUI provides online active processing (OLAP) that allows a user to "drill down" through the data to gain valuable insight into the sources of profitability and the areas that need improvement.

A customer relationship management system (CRM) 156 is also shown as part of the customer profitability analysis system 150. The CRM 156 is not actually involved in the calculation or analysis of the customer profitability analysis, but may be a consumer of the customer profitability results. The CRM 156 pulls customer profitability data from the profitability data mart 158. The CRM may use such data for numerous purposes, such as determining the effectiveness and value of its customer relations efforts, or tailoring its relationship management efforts to individual customers' profitability. For example, customer relations management efforts may be designed such that the most profitable customers receive the most attention, while less profitable customers are given lower priority. Other operating systems in the enterprise can also consume the customer profitability information.

A reporting module 164 is provided to generate a plurality of predefined reports 166. The reports are created to display the customer profitability data in an organized insightful manner that allows a business intelligence consumer to quickly absorb the data and comprehend its import. The reports will typically contrast two or more KPIs dimensioned by some customer attribute. For example, a report may show customer profitability by customer profitability tier over a number of years in order to highlight profitability trends among various segments of the customer population. The reporting module 164 pulls the customer profitability data necessary to populate the various reports from the data mart 158 and generates the reports. The module may be a standard software package customized for interfacing with the profitability data mart and generating the reports. The reports 166 may be published as printed documents or as electronic pages accessible via the GUI 162 or some other interface module.

Figure 4:
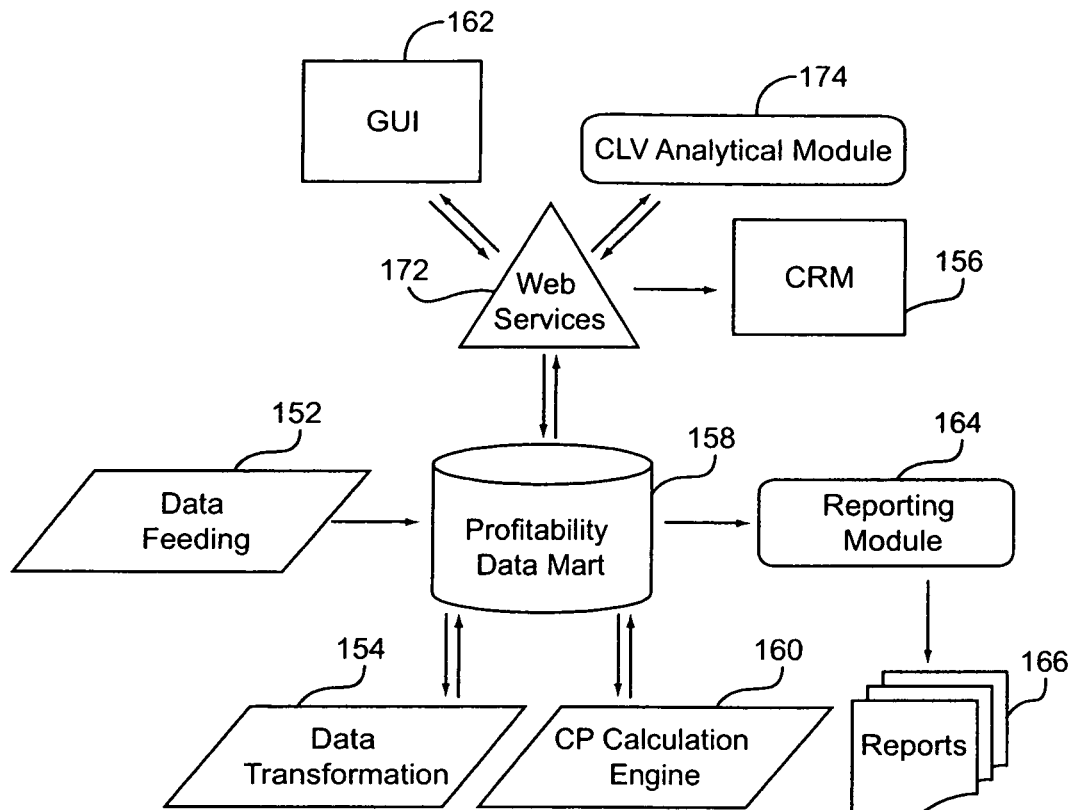
FIG. 4 is a block diagram of another embodiment of a customer profitability analysis system according to the invention.

The system shown in FIG. 3 does not include provisions for calculating Customer Lifetime Value. The customer lifetime value function may be provided as an add-on to the system 150 shown in FIG. 3. FIG. 4 shows such a system 170. The system 170 is similar to the system 150 and includes many of the same elements of FIG. 3. Like elements between the two systems 150,170 are identified with like reference numbers. Thus, the system 170 includes a data feeding module 152, data transformation module 154, a CRM system 156, a profitability data mart 158, a customer profitability calculation engine 160, a GUI 162, a reporting module 164, and a plurality of reports 166. The system 170, however, also includes a web services module 172 and a customer lifetime value analytical module 174. The system 170 alters the interfaces between the GUI 162, the profitability data mart 158, and the CRM system 156. In the system 170 the Web Services 178 are responsible for retrieving and distributing information to the different user interfaces.

Figure 5:
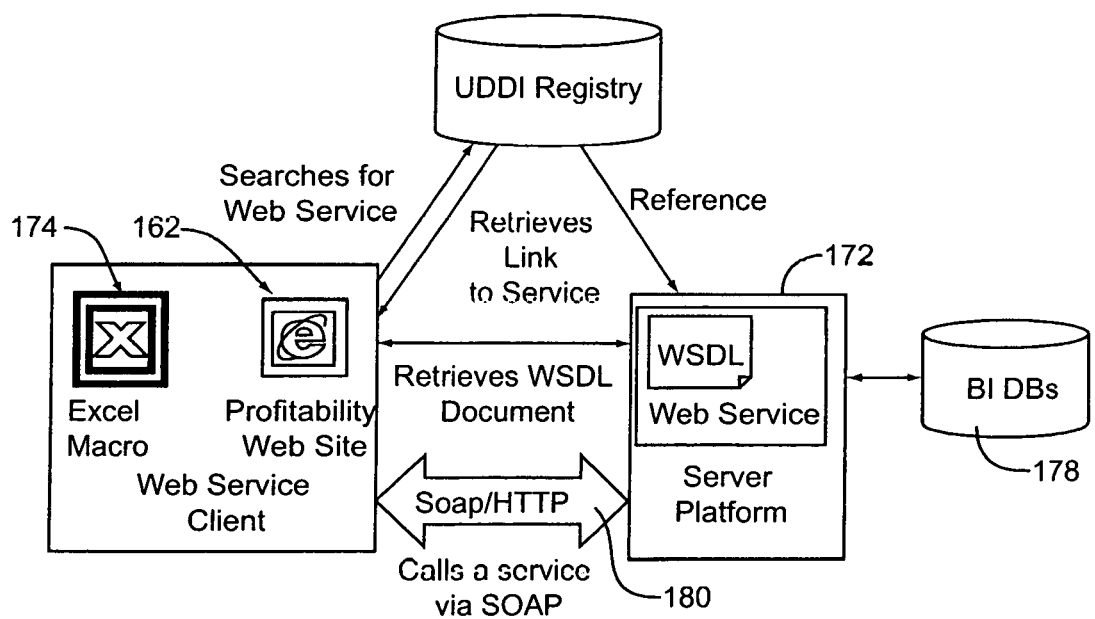
FIG. 5 is a block diagram of a web services architecture for interfacing a profitability data mart, a graphical user interface, a customer relationship management system, and a customer lifetime value module.

The CLV module 174 may be considered a web services client. FIG. 5 describes the manner in which different applications that need to retrieve profitability information access the data mart 158 through web services 172. In this embodiment, the GUI comprises an intranet profitability website 162 which is a web services client. The CLV module 174 and the profitability web site 162 pull data from the data mart 158 through the web services interface. The client applications can retrieve the web service specifications through a UDDI registry 176 and then exchange the information with the profitability data mart 158 through SOAP protocol 180. The web services layer 172 enables different platforms to access the profitability information. For example, the web services layer 172 may provide access to users who use smartphones or other mobile devices. A potential scenario would be to retrieve profitability information about a customer before personally contacting the customer.

According to an embodiment of the invention, the CLV module 174 may be a spreadsheet document created using a commercial spreadsheet program such as Microsoft Excel. In this case the spread sheet includes a plurality of calculation macros for projecting historical profitability into the future. For example, the CLV spreadsheet may pull all of the aggregate historical profitability data for a statistically significant segment and/or sub-segment of the customer population, these data will include all elements of customer profitability, including all revenue and cost components. The macros in the CLV spreadsheet may calculate future trends from the historical data and apply such trends toward calculating future profitability. Alternatively, trend data may be altered by a business intelligence consumer in order to determine how steps taken to alter current trends may impact future profitability.

A simple example is best to illustrate the operation and power of the CLV module. Assume the CLV analysis is to be performed on a segment of the customer population comprising moderate chatters acquired in 2003, further assume that moderate chatters have historically had an average customer lifetime of 5 years. Since they have already been customers for two years in 2005, this group of customers can be expected to remain customers for 3 more years until 2008. Suppose the average current profitability of members of this market segment is €20 per month or €240 per year. If nothing changes, this group of customers can be expected to generate €20 each month for the next three years for a total of €720. Applying a discount rate of for example 3% provides a net average profitability of €699.42 for members of this group. However, what if the current trend is that revenue is expected to grow at a rate of 10% each year for the next three years. The average profitability each month for the first year would be €22 per month for a total of €264. €24.20 per month the second year for a total of €290.40, and €26-62 per month the third year for a total of €319.44 thus the total average profitability over the entire 3 year period would be €873.84 having a net present value of €847.30.

The CLV module 174 allows a business intelligence consumer to alter data and trends in order to determine the effects various changes will have on future profitability. For example a business intelligence consumer may wish to explore the potential effects of a prospective marketing campaign to a group of customers. The average cost of the campaign may be for example €3.00 per customer. Its impact on the average customer lifetime duration may only be 6 months. Using the CLV analysis tool, the future average profitability for the group of customers to whom the campaign is directed may be calculated. A CLV value that takes into account the costs and benefits of the campaign may be calculated along with a CLV value that does not consider the effects fo the campaign. Based on the two values a business user may determine whether the positive effects on profitability justify the cost of the campaign.

The client-server architecture of the web services module 172 is shown in FIG. 5. The web services approach enables different platforms to consume the same information within the customer profitability data mart using the same business logic. For example, the intranet User Interface 162 allows users to define the unitary costs that impact the customer profitability, define what KPIs should be calculated by the engine, and display the results at the customer or segment level with a variable level of detail. A spreadsheet 174, properly configured to deploy the customer profitability web services, has the same functionalities as the profitability website 162. Users can insert unitary costs into the spreadsheet 174 and click a button to execute a macro that triggers a call to the web service 172, passing the inserted information. The web services 172 is in charge of controlling and validating the inserted information, handling the connection to the profitability data mart, and updating the information in the data mart with the data inserted in the spreadsheet 174. A similar process allows customers to retrieve profitability information from the data mart and display them in the spreadsheet 174 rather than the intranet user interface 162. The selection of which platform to be used depends on user preferences. If, for example, the information must be further elaborated upon, it is better to use the spreadsheet based interface 174, since the retrieved data can be saved on the user's local computer and analyzed there. If the information must be quickly accessible on-line the web based intranet interface 162 is likely to be more appropriate.

An embodiment of the invention is specially adapted for analyzing the customer profitability of a telecommunications service provider. According to this embodiment, the initial step of identifying revenue and cost sources 102 from the flow chart 100 in FIG. 2 has been performed in advance based on typical operating practices in the telecommunication industry. In general, two sources of revenue have been identified for telecommunications service providers. The first is revenue derived directly from customer billing. Such data may be received directly from the telecommunications service provider's invoice or billing system.

A second source of revenue for telecommunications service providers is interconnection fees. Calls are often made between parties who subscribe to different telecommunications service providers. When a first party using a first telecommunications service provider places a call to a second party who uses a second telecommunications service provider, the first telecommunications service provider must pay a fee to the second telecommunications service provider for providing the service of terminating the call with the second party. A result of these interconnection fees is that a customer who receives many calls from outside his or her service provider's network, but places few calls to parties outside the network, could be more profitable than a customer who receives few calls from outside the network but places many calls to parties outside the network. The fees associated with terminating calls originating outside a telecommunications service provider's network can constitute a significant source of revenue that affects profitability. The data relating to interconnection and termination fees (both the revenue associated with terminating calls made from outside the network and costs associated with calls to parties outside the network that must be terminated by others) may be received directly from the telecommunications service provider's network operating systems. The data must include the customer and the fee either received (revenue) or paid (cost) for terminating out of network calls.

On the opposite side of the ledger, many sources of costs have been identified relating to providing telecommunications services to customers. The various sources of costs which affect profitability may be grouped into related families of costs. Thus, there are costs associated with acquiring new customers (Subscriber Acquisition Costs or SAC); retaining existing customers (Subscriber Retention Costs or SRC); servicing customers' needs (Customer Care Costs); billing and accounting (Bureau Services Costs); and costs associated with termination fees paid to other telecommunications service providers for calls made outside the telecommunications service provider's network (Usage Costs).

Service Acquisitions Costs may include commissions paid to retailers and agents for signing new customers to various service plans and subsidies paid for purchasing or offsetting the cost of a customer's handset. There may be many different types of commissions and handset subsidies, resulting in different acquisition costs depending on the type of customer, the type of plan the customer subscribes to, and so forth. Factors that may influence the type and amount of a particular commission may include the service plan, the type of access, or the type of commission. The cost of various handset subsidies may be determined by the cost of handset, the type of access, and the particular service plan the customer subscribes to.

Customer retention costs may include the costs of marketing campaigns for contacting existing customers for the purpose of stimulating greater and more profitable usage, and loyalty programs aimed at enticing customers to stay with the telecommunications service provider when their contracts expire rather than defecting to competitors. The cost of marketing campaigns is governed by the cost of contacting individual customers over the desired communication channel, multiplied by the number of customers contacted. The cost of loyalty programs may be based on the costs of the awards given to customers when they elect to stay with the service provider.

Customer Care Costs are those costs associated with servicing the customer's needs beyond providing the basic telecommunications services called for in the customer's service plan. Specific cost sources within the Customer Care family of costs include call center operations, technical support, and processing service inquiries. Call center costs may be allocated based on the market segment a customer belongs to, the reason for a customer's call to the call center, and the number of calls made by the customer to the call center. Technical support costs may be based and the type of trouble ticket generated when a customer calls for technical support, or the trouble ticket area. The cost of service inquiries may be related to the particular service that is the subject of an inquiry.

Bureau Services costs include the costs of producing invoices and delivering them to customers. Bureau's services costs also include the cost of credit for late receipt of customer payments.

Finally, usage costs include the costs of termination services provided by other telecommunications service providers as well as the costs associated with using the telecommunications service provider's network. Typically service margins are expressed as a percentage of revenue. To determine the cost of a call the revenue from the call is multiplied by the service margin. The remainder is allocated to costs.

The embodiment adapted for analyzing the customer profitability of a telecommunications provider further includes predefined rules for allocating revenue and costs to individual customers. Again, these allocation rules have been developed based on common practices within the telecommunications industry. According to this embodiment, allocating revenue is relatively straightforward. Each customer's invoice charges may be allocated directly as revenue derived from the customer. Additional revenue based on the interconnection fees received for terminating calls received by the customer from outside the telecommunications service provider's network are also allocated to customers on a customer-by-customer basis.

The present embodiment employs activity based costing for allocating heterogeneous costs to individual customers. Under this procedure all activities that incur cost are identified and grouped together by activity type. Each activity within an activity type is defined by its own set of cost drivers. For example, customers may call a call center for many different reasons. Each call to the call center may be considered an activity within the same activity type. Nonetheless, the reason for a call to the call center may have a significant impact on the actual cost of handling the call. A customer call reporting a lost handset may be less expensive to process than a customer calling to dispute charges on his or her last billing statement. In other words, the reasons for the calls drive the cost. Thus, while all calls to a all center may be considered to be of the same activity type, each call is a separate activity based on the reason for the call. Each pre-defined reason for a call center call may have its own set of costs associated with it. For example, in the scenario just described, a lower cost will be allocated to a customer calling a call center to report a lost phone and a higher cost allocated to a customer calling to dispute billing charges. Similar cost allocation provisions may be made for other activities and activity types as well. For example, paying commissions may be an activity type. Multiple different commissions may be paid depending on the circumstances surrounding the acquisition of a new subscriber. Payment of each different commission comprises a separate activity having a distinct cost associated with it. One or more costing activities are defined for each cost source described above. Each time an activity is performed in relation to a customer, the cost associated with the activity is allocated to the customer.

With regard to step 106 of the flowchart 100 of FIG. 2, a number of Key Performance Indicators have been defined for purposes of analyzing the customer profitability of a telecommunications service provider. In addition to customer profitability, KPIs have been defined for each source of revenue and cost described above. Accordingly, in the embodiment relating to the customer profitability of telecommunications service providers, KPIs are defined for commissions; subsidies; marketing campaigns; loyalty programs; call center costs; technical support costs; service inquiry costs; invoice costs; due credit costs; and service margins. KPIs also include aggregate profitability; average revenue per user; operating income; and customer costs.

Referring now to the system 150 shown in the block diagram of FIG. 3 as well as flowchart 100 of FIG. 2, revenue and cost data are collected in the present embodiment by interacting directly with the telecommunications service provider's external operating systems. Preferably, the data are gathered directly from the systems in which they are generated. For example, the data feeding module 152 may be adapted to interface directly with the telecommunications service provider's customer invoice system in order to receive customer revenue data. Invoice data may be received via batch processes run on a periodic basis, such as once each month corresponding to the telecommunications service provider's billing cycle, every evening at the close of business, or on some other periodic basis. In other cases it may be desirable to receive the data directly as soon as the data are available on a real-time or near real-time basis. The data feeding module 152 may similarly interface directly with the telecommunications service provider's network control systems to receive revenue data based on interconnection traffic.

The data feeding module may likewise interface directly with the telecommunications service provider's other external systems to collect cost data. Preferably the data feeding module 154 collects the cost data directly from the systems in which the data are created. For example, the data feeding module 154 may interface directly with the telecommunications service provider's ERP system in order to collect subscriber acquisition costs. Subscriber retention costs may be received from Campaign Management systems. Call center, technical service and service inquiries data may be received from Customer Relations Management systems 156. The Bureau Services costs may be received from ERP systems. Finally, usage cost data may be received from Billing, Interconnection or other specialized systems. In all cases the interfaces between the various systems supplying the information and the data feeding module are such that all data necessary to identify and allocate the revenue and cost data are provided in a manner consistent with the requirements of the system and for storage in the profitability data mart 158.

In addition to cost and revenue data, customer attribute data may also be stored in the profitability data mart 158. Like the cost and revenue data, the customer attribute data may be collected directly from the systems that create the data, or wherever the customer attribute data are typically stored. For Example, customer attribute data may be received from customer intake systems that are invoked when a new customer is acquired, or from CRM systems which store customer data. Additional attributes may be derived from the customer profitability analysis itself. Alternatively, customer attribute data may be received from a data warehouse or other application. A robust set of customer attributes allows customer profitability to be analyzed from multiple vantage points, such as across different market segments, different subscriber types, geographical regions, profitability tiers, age groups, and the like. The reporting module 164 uses the attribute data to filter the profitability KPIs to create meaningful reports that show the differences between different classes of customers.

Figure 6:
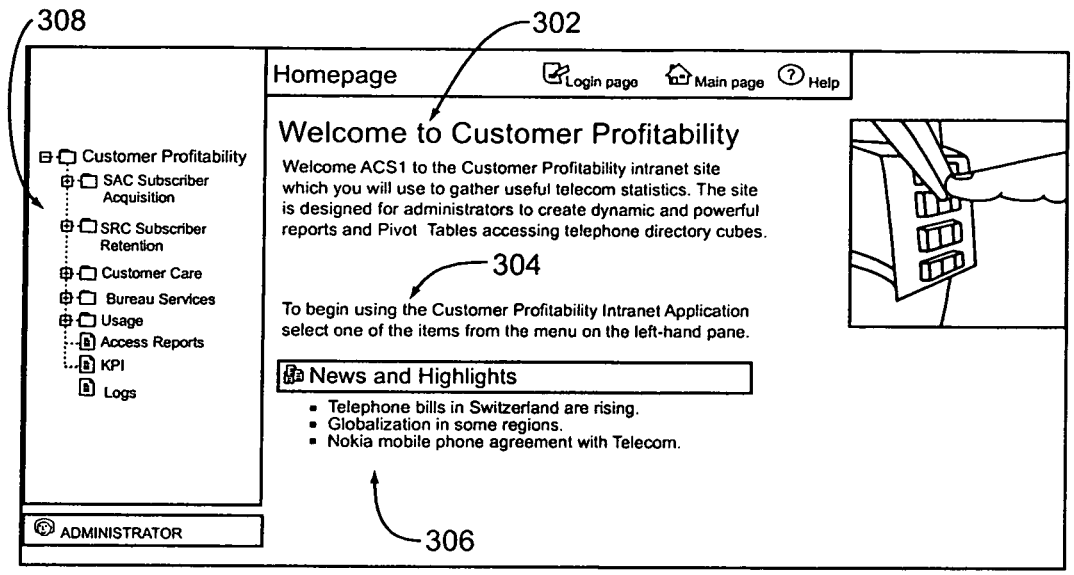
FIG. 6 is an opening page of an internet website based graphical user interface adapted to interface with a customer profitability data mart.
Figure 7:
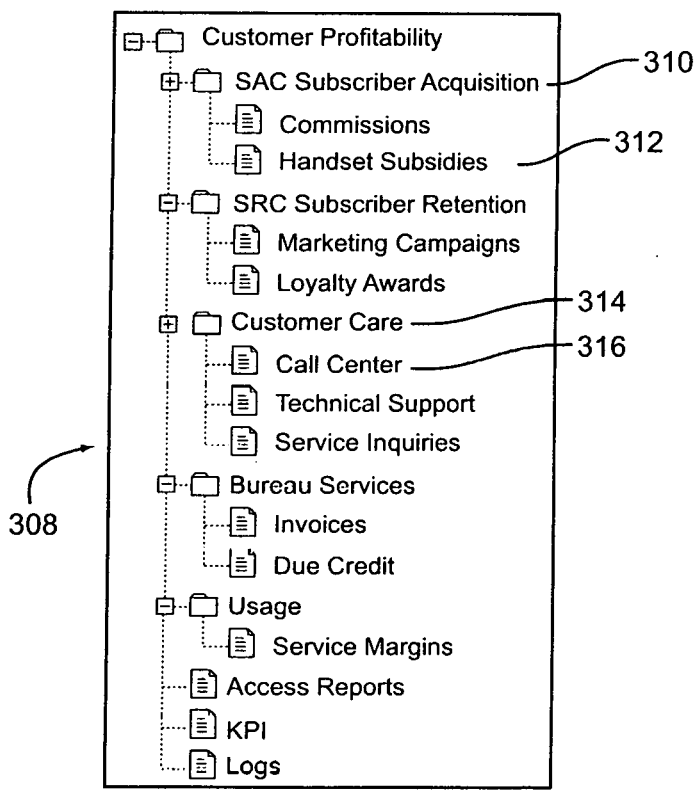
FIG. 7 is a navigation tree for navigating through the internet website based graphical user interface.

The GUI 162 may be for example, a web based intranet site. FIG. 6 shows a home page 300 for an intranet web based GUI. The home page 300 includes a welcome message 302, instructions for navigating through the site 304, editable content such as news and highlights 306, and a navigation tree 308. A user may navigate through the site by selecting the various headings associated with the branches of the navigation tree. The navigation tree remains present in the margin framing the content of the various pages of the site. A complete version of a navigation tree 308 with each heading fully expanded is shown in FIG. 7. According to this embodiment, a user may view handset subsidy data, for example, by expanding the SAC subscriber acquisition folder 310 and selecting the handset subsidies document 312 displayed thereunder. All of the other areas within the GUI intranet web site are accessed in the same manner.

FIG. 8 shows a GUI intranet web page 330 for displaying call center data. The call center display page is accessed by expanding the customer care folder 314 on the navigation tree 308 and selecting the call center document 314 displayed below the customer care folder 316. The call center display page 330 displays records 332 relating to call center costs. Each record includes fields identifying the record number 334, a market segment 336, a contact reason 338, an amount 340, a start date 342, and an end date 344. Each record 332 relates to a defined call center activity, i.e. handling various types of customer calls. The segment 336 identifies whether the caller is a business customer or a residential customer (or some other designation if other market segments are defined). A plurality of contact reasons 338 are defined for categorizing the various reasons why customers call the call center. For example, the contact reasons shown in FIG. 8 include "new product purchase;" "general information;" "bill inquiry;" and "technical problem." The cost entry 304 defines the cost associated with the various call center activities. The start and end dates 342, 344 define the period during which the record will be in effect. For example, according to record no. 1 a call from a residential customer for the purchase of a new product will bear a cost of $2.04 if it occurs between Jan. 1, 2001 and Dec. 31, 2003. New records defining new call center activities may be added by selecting the add button 346. Records may be altered by selecting the edit button 348 associated with the record.

FIG. 9 shows a call center modify/delete page 350 which allows a user having appropriate access rights to modify or delete call center records. Pages similar to the call center display page 330 and the call center modify/delete page 350 exist for all other cost sources. These additional pages associated with other cost sources, allow users to view, add and modify records relating to other costs in a similar manner.

Figures 10, 11:
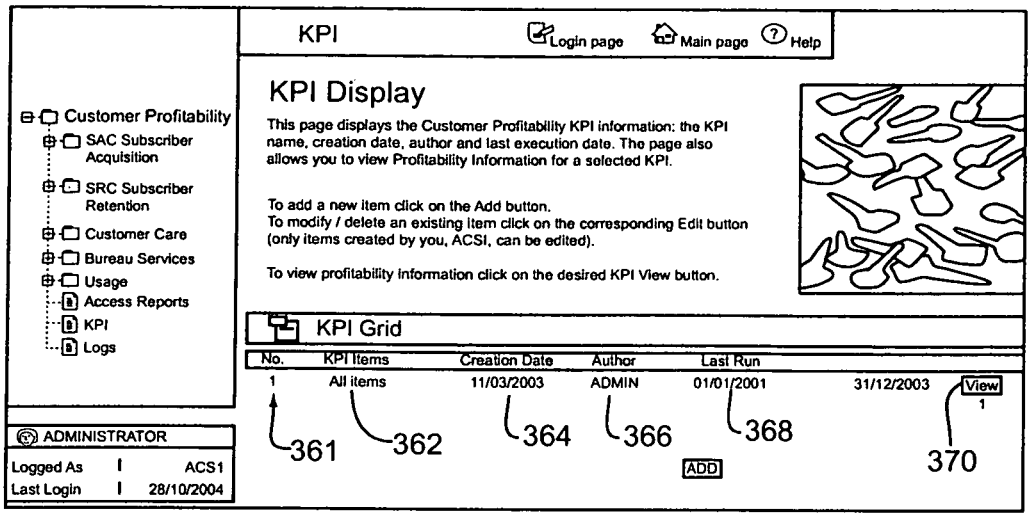
FIG. 10 is a GUI intranet web page for viewing KPI records.
FIG. 11 shows sample KPI ARPU records.
Figure 12:
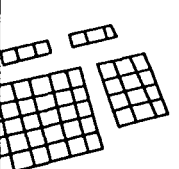
FIG. 12 is a GUI intranet web page for adding a KPI.

FIG. 10 shows a GUI intranet web page 360 for displaying KPI. The KPI display page 360 displays the customer KPI information including KPI number 361, KPI name 362, KPI creation date 364, KPI author 366, and last execution date 368. The pages within the KPI section allow the user to view, create, modify and delete KPI records. A KPI record is composed of one or more KPI items. To view the KPI items associated with a KPI record, the user selects the view button 370 adjacent the desired KPI record. For example, FIG. 11 shows the various KPI items associated with the KPI record ARPU, namely items RO1 fixed fees, RO2 recurring charges, RO3 revenue by usage, and RO6 positive adjustment. FIG. 12 shows a KPI Add web page 374. The KPI Add page 374 includes a KPI name field 378 for naming the new KPI. The new KPI can be defined by adding KPI items by selecting from the check boxes 372 associated with each KPI item. When new items are added to a KPI the system recognizes whether the item is a revenue item or cost item and adds or subtracts the value of the KPI item from the overall value of the KPI accordingly.

Figure 13:
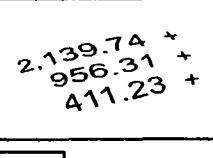
FIG. 13 is a GUI intranet web page showing KPI All Items profitability information.

The KPI section, in addition to allowing the user to add, modify and delete KPI records and corresponding items, also allows the user to view the profitability information. FIG. 13 shows the KPI "All Items Profitability Information" page 380. The profitability information page 380 includes a profitability information tree 382. The profitability information tree 382 displays all of the profitability information relating to a selected KPI. In the case of the page 380, profitability data for all items are displayed, including costs 384, discounts 386, and revenue 388. The various items may be viewed in detail by expanding the appropriate heading. For example, in the profitability information tree 382 the revenue heading 388 has been expanded to display fixed fees 390 interconnect revenues 392, invoice revenue 394, recurring charges 396, and revenue by usage 398.

Figures 14, 15:
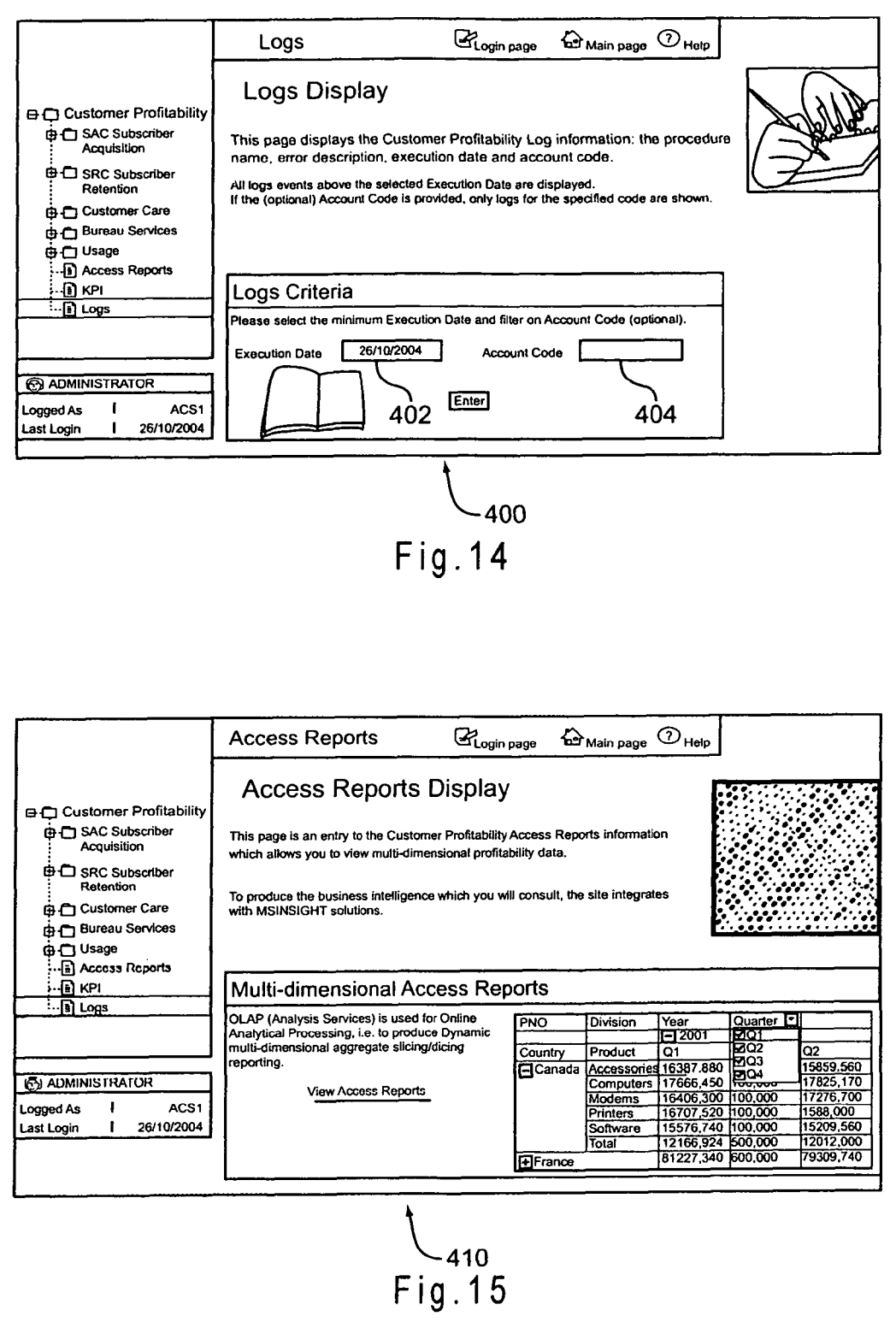

A logs page 400 is shown in FIG. 14. The logs page allows a user to view log files from specified dates 402. The user may further filter results by inserting an account code in the account code field 404.

Finally, an access reports page 410 is shown in FIG. 15. The access reports display page 410 provides an entry point to the customer access reports. The access reports allow a user to view multi-dimensional profitability data. Online active processing produces dynamic aggregate reporting.

In the embodiment of the invention relating to analyzing the customer profitability of a telecommunications service provider's customer base, a number of standard reports have been defined. The standard reports incorporate customer profitability, KPIs and customer attributes that are known to be of interest to those who seek insight into the profitability of telecommunications companies.

Before describing the reports themselves it is beneficial to review the KPIs and introduce the customer attributes on which the reports are based. Among the most useful attributes for classifying telecommunications customers is their usage patterns. Accordingly, for purposes of the present embodiment telecommunications customers have been grouped into five segments, or tiers: big spenders; heavy talkers; moderate chatters; casual callers; and safety users. The segment or tier in which a particular customer falls may be determined by the actual number of minutes the customer uses each month, the average number of minutes the customer uses each month, or some other measure. Of course, if desired more or fewer segments or tiers may be defined and other divisions made amongst the various customer segments or tiers.

Another useful attribute is subscriber type. Telecommunications service providers typically offer multiple service plans. Customers may be grouped according to the type of plan that they have subscribed to. The service plans offered by different telecommunications service providers will generally vary from one service provider to another. For purposes of the present description, customers will be grouped according to generic subscriber types A, B, C, D, and E. Of course, the number of subscriber types and their actual designations will differ according to the service plan offerings of particular telecommunications service providers Yet another customer attribute that may be used to categorize customers is the market segment to which the customer belongs. For example, customers may be identified as either business customers or residential customers. Other market segments may also be defined depending upon the needs and customer base of a particular telecommunications service provider.

Some telecommunications service providers offer discount plans to entice customers to subscribe their service offerings. In such cases, the discount is typically expressed as a percentage of the normal service rates of the particular plan for which the discount is offered. The customer discount is another attribute by which the customers may be classified for purposes of analyzing profitability. Additional attributes by which a telecommunications service provider's customer base may be broken down may include the sales channel through which a customer relationship was established, and the types of seller or agent who secured the relationship.

In addition to customer attributes, it is also desirable to analyze profitability in terms of various operational parameters. For example, it may be desirable to measure the effectiveness of marketing campaigns by measuring their effect on profitability. Similarly, it may be desirable to measure the effectiveness (and costs) of customer service efforts by taking customer profitability into account. Useful data from a marketing campaign may include the list of customers contacted during the campaign (and all the attributes associated with the customers contacted); the number of calls made during the campaign; the number of calls answered during the campaign; the number of calls in which the customer answered but hung up before listening to the promotion, and so forth. Customer service data may include the number of calls made to a call center; the identities of the customers placing the calls (and all the attributes characterizing the customers making the calls); the reasons for the calls; the duration of the calls; and the amount of time the customer waited before reaching a call center operator. For technical service requests useful data may include the number of trouble tickets initiated; the identities of the customers who have initiated trouble tickets; (and all the attributes characterizing the customers); and the technical service areas to which the trouble tickets relate.

Finally, it may be beneficial to group customers in terms of the profitability results. Various profitability thresholds may be established, and customers whose profitability exceeds various thresholds may be classified as platinum, gold, silver, and bronze, for example, in rank order of their profitability.

FIGS. 16-32 illustrate various reports that have been developed for analyzing customer profitability for telecommunications service providers. The reports compare and contrast the customer profitability and various KPIs in terms of customer segments or tiers, subscriber type, profitability segment, market segment, and other customer attributes and operational parameters. The KPIs include profitability, average profitability, average revenue per user (ARPU), costs, and others that will be described as they appear.

Figure 16:
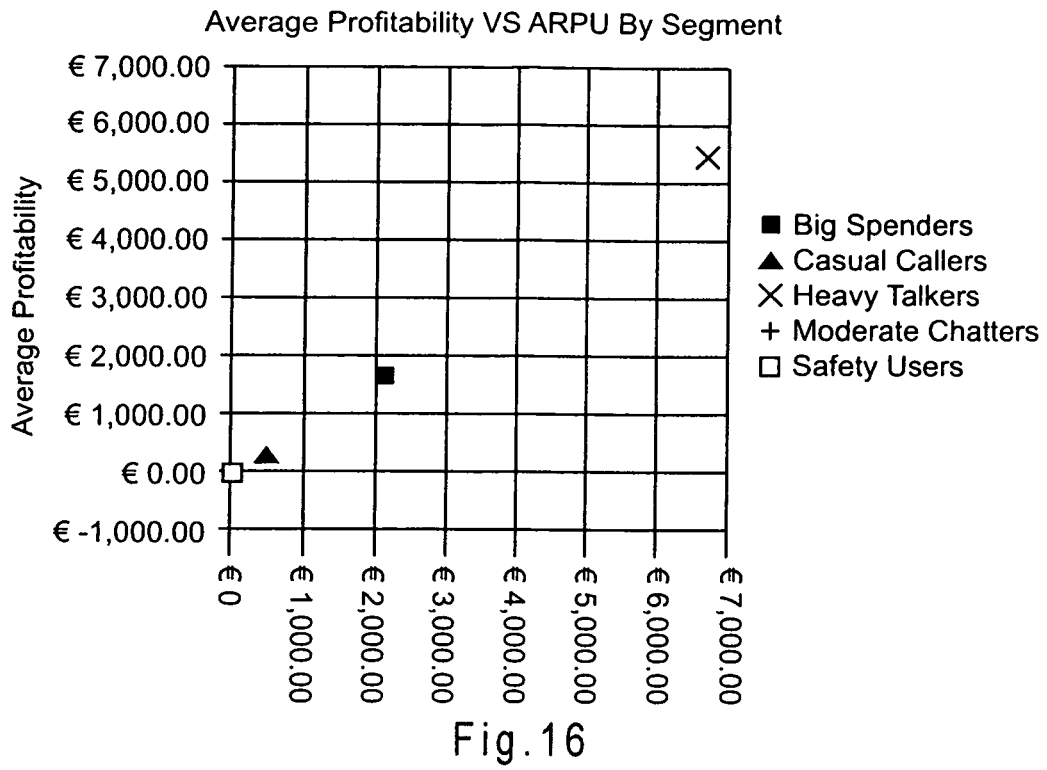
FIG. 16 is a sample report showing Average Customer Profitability versus Average Revenue Per User (ARPU) by customer segment.

FIG. 16 is a sample report that shows Average Customer Profitability versus Average Revenue Per User (ARPU) by customer segment. The purpose of the report is to present the distribution of the ARPU in combination with the average profitability. The data for this report may be provided in tabular or graphical form. The graphical form of the report shown in FIG. 16 clearly shows that that big spenders have both the highest ARPU and the highest average profitability. Safety users have both the lowest ARPU and the lowest average profitability. Moderate chatters, casual callers and big spenders occupy positions in between. A further insight that can be taken away from the report is the upward trend of the data. As ARPU increases profitability increases as well in a nearly linear manner.

Figure 17:
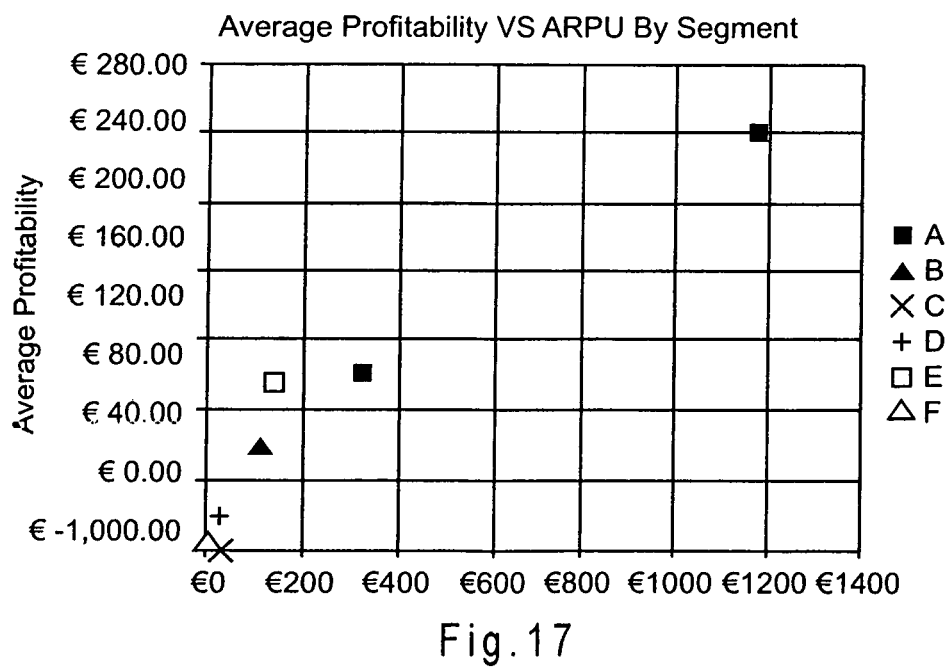
FIG. 17 is a sample report showing Average Profitability versus ARPU by subscriber type.

FIG. 17 is a sample report showing Average Profitability versus ARPU by subscriber type. The purpose of this report is to present the distribution of the ARPU in combination with the Average Profitability by subscriber type. The data for this report may be presented in tabular form or in graphical form as shown. The report immediately makes clear that subscriber type A generates the most revenue per user and the highest profitability, whereas subscriber types C and F generate the least.

Figures 18, 19:
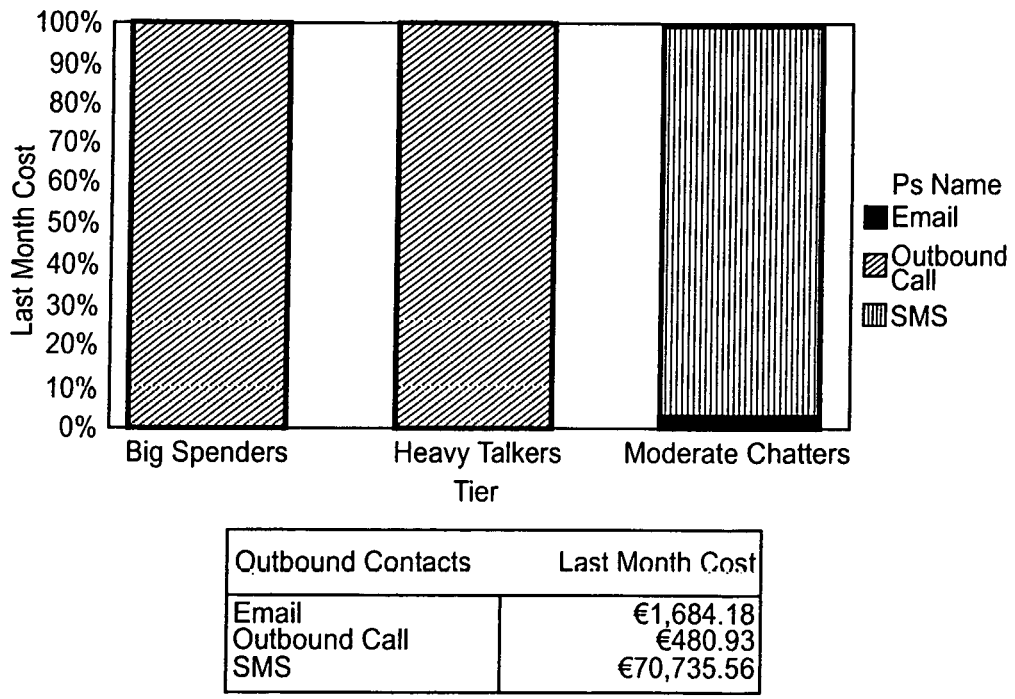
FIG. 18 is a sample report illustrating customer profitability by percentage of discount across customer segments.
FIG. 19 is a sample report illustrating a marketing campaign's contribution to profitability.

FIG. 18 is a sample report illustrating customer profitability by percentage of discount across customer segments. The purpose of this report is to present the customer profitability in terms of the percentage discount applied to customers in various customer segments. Not surprisingly the report shows that across all customer segments, customers having the lowest discount have the highest profitability.

FIG. 19 is a sample report illustrating a marketing campaign's contribution to profitability. The purpose of the report is to present the marketing campaign contribution to profitability per customer tier by marketing channel. As can be seen 100% of the costs of contacting Big Spenders and Heavy Talkers where incurred by outbound calls, whereas a small percentage of to Moderate Chatters were contacted via email and the rest via Small Message Service (SMS) text messages. The data illustrated in this report is historical, representing the previous month's marketing campaign.

Figure 20:
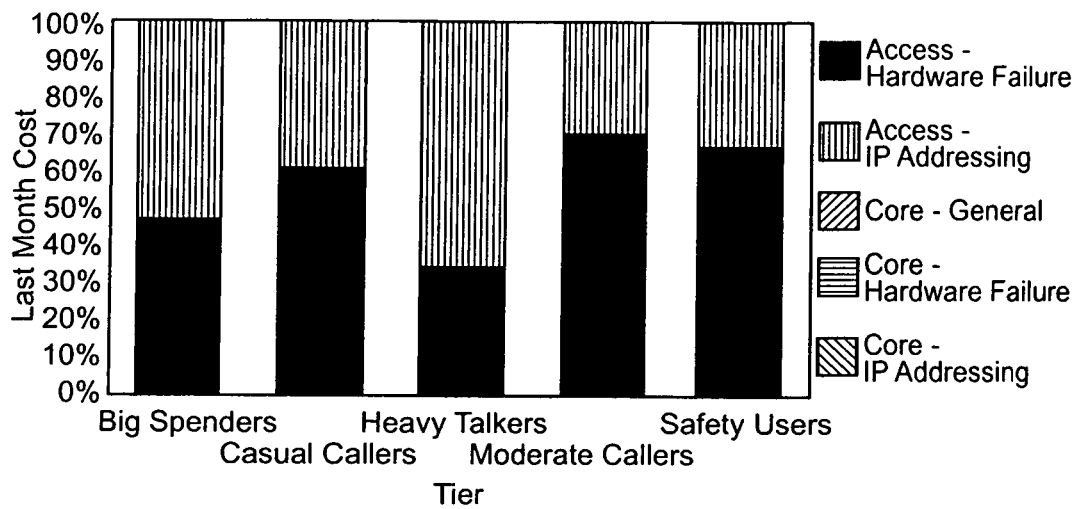
FIG. 20 is a sample report illustrating technical support costs' contribution to profitability by customer tier.

FIG. 20 is a sample report illustrating the contribution of technical support costs to profitability by customer tier. The report presents in graphical or tabular form the contribution of various technical support areas to the overall technical support costs for the previous month. In the example shown all technical support costs for the previous month where related to either access hardware failures or access IP addressing failures. The division between the two types of failures ranged from between approximately 32% to 68% of the total technical support costs, depending on the customer segment.

Figure 21:
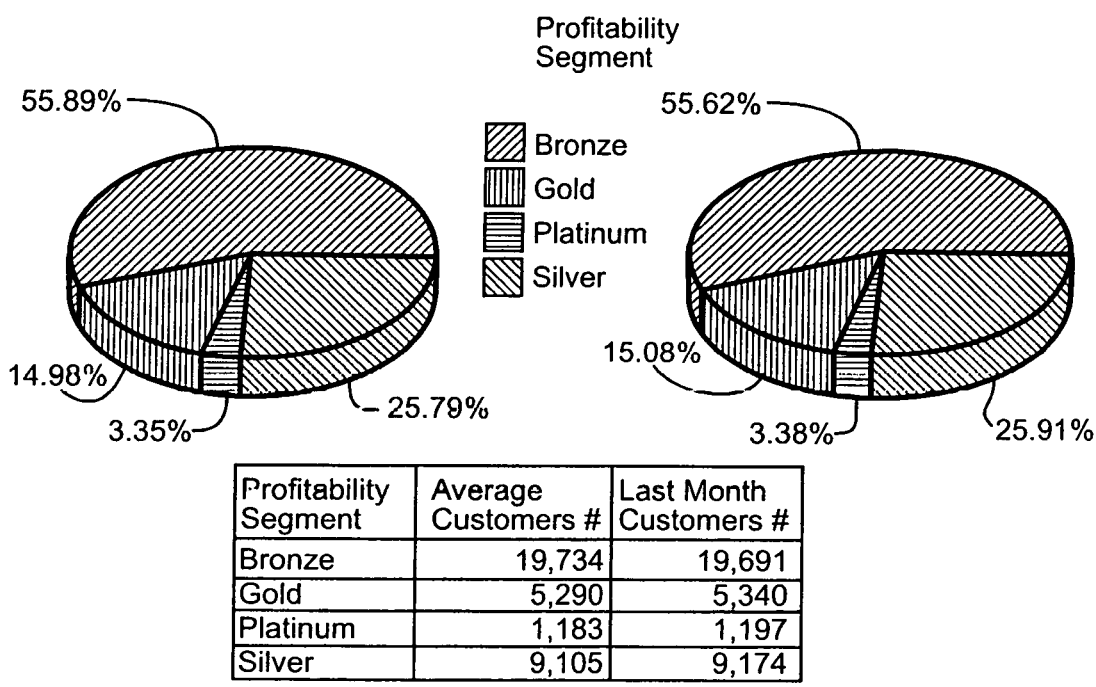
FIG. 21 is a sample report illustrating the distribution of customers by profitability segment.

FIG. 21 is a sample report illustrating the distribution of customers by profitability segment. The report displays the average number of customers in each profitability tier for the present month and the previous month in order to show trends. The circle charts show the customer distribution for the two months as a percentage of the total customer population.

FIG. 22 is a sample report illustrating the distribution of both profitability and customers per market segment. The report includes two consecutive months worth of data to illustrate trends. As can be seen, business customers are responsible for a much greater share of profits, but residential customers represent a much greater share of the customer base.

Figure 23:
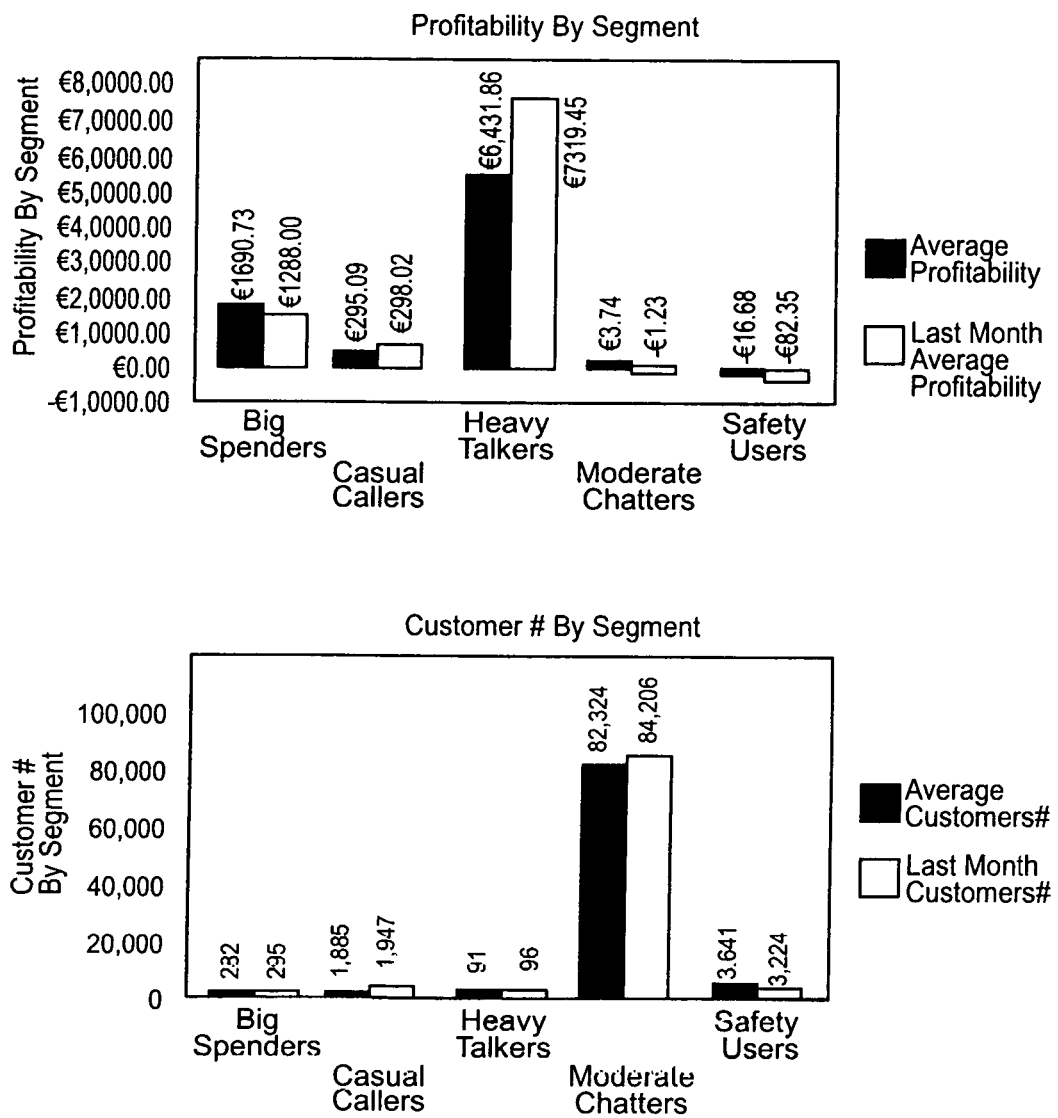
FIG. 23 is a sample report illustrating profitability by segment, customer distribution by segment, and customer distribution by profitability tier.

FIG. 23 is a sample report illustrating profitability by segment and customer distribution by segment. Although not shown, a report may also be included showing customer distribution by profitability. Again, data for two consecutive months are shown. The charts clearly show that Heavy Talkers are the most profitable. Most customers are moderate chatters. And most customers are in the less profitable silver category.

FIG. 24 is a sample report illustrating profitability by subscriber type and the distribution of customers by subscriber type. Again, data for two consecutive months are shown in order to illustrate trends. Subscriber type A is clearly the most profitable, but makes up the smallest portion of the customer base. The largest numbers of customers are in subscriber types C and F, which happen to be the least profitable subscriber types.

FIG. 25 is a sample report showing profitability by market segment and subscriber type. The data shown in FIG. 25 are similar to the data in FIG. 24 but further broken down by business and residential market segments.

Figure 26:
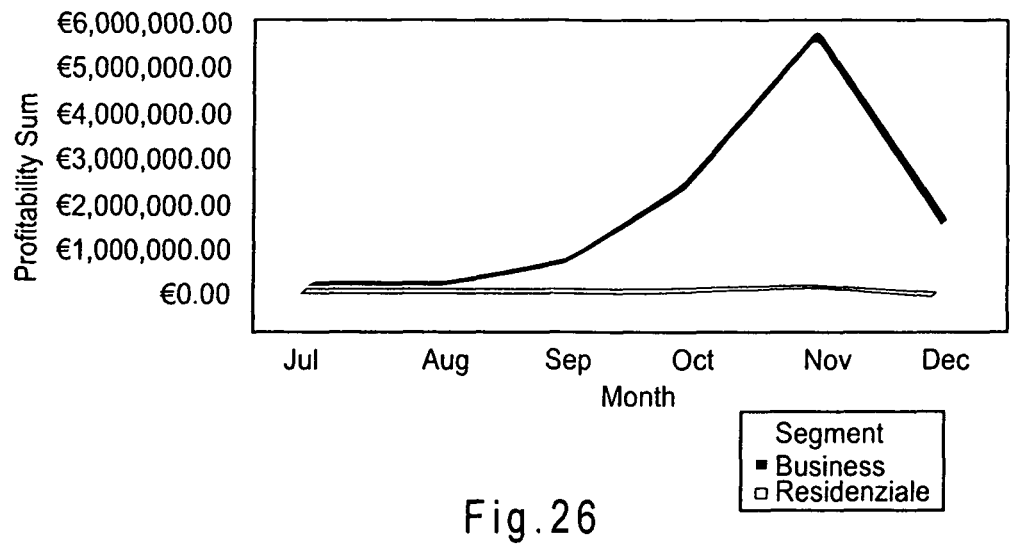
FIG. 26 is a sample report illustrating the profitability trend by subscriber type over a six month period.

FIG. 26 is a sample report showing the profitability trend by market segment over a six month period. As can be seen, the profitability of business customers increased significantly from August through November and fell off again in December. The profitability of residential customers remained substantially flat over the same period.

Figure 27:
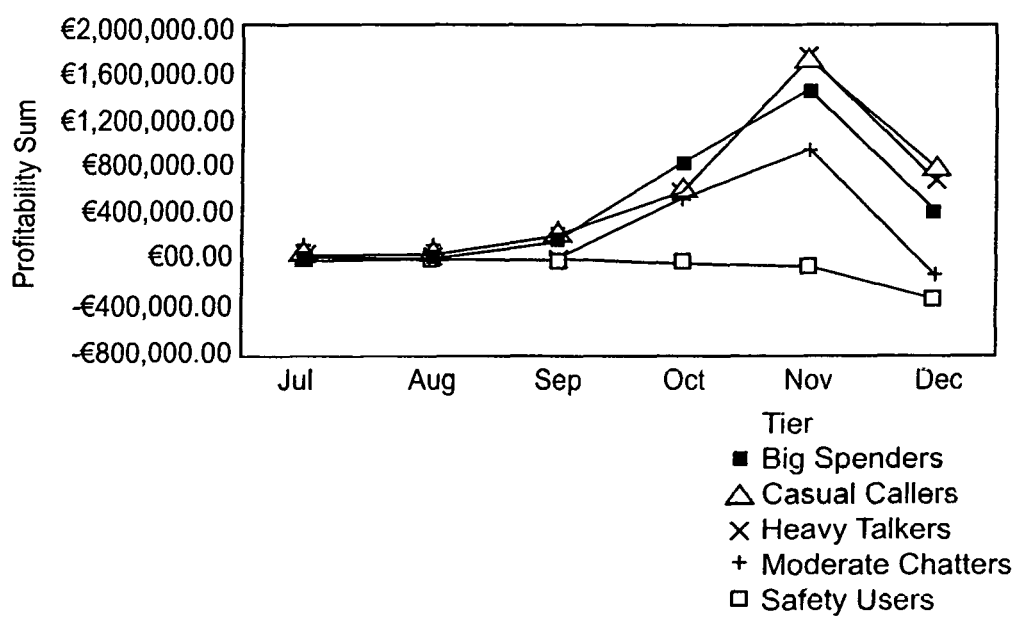
FIG. 27 is a sample report showing the profitability trend by customer segment over a six month period.

FIG. 27 is a sample report showing the profitability trend by customer segment over a six month period. Similar to the previous report, the profitability of all customer segments except safety users increased through November when profitability peaked, and fell off again in December. The profitability of safety users remained substantially flat throughout the period, falling negative in December.

FIG. 28 is a sample report illustrating the profitability trend by subscriber type over a six month period. Again, the trend curve has a similar shape to those shown in FIGS. 27 and 28. Profitability for subscriber types B, D, and E increased through November, and fell off again in December, whereas the profitability for subscriber types A, C and F remained substantially flat throughout the period.

FIG. 29 is a sample report illustrating average profitability by sales channel and the customer distribution amongst the different sales channels. Data from two consecutive months are shown. As can be seen, direct sales resulted in the highest average profitability, but most customers were acquired through call center contacts or through indirect sales.

Figure 30:
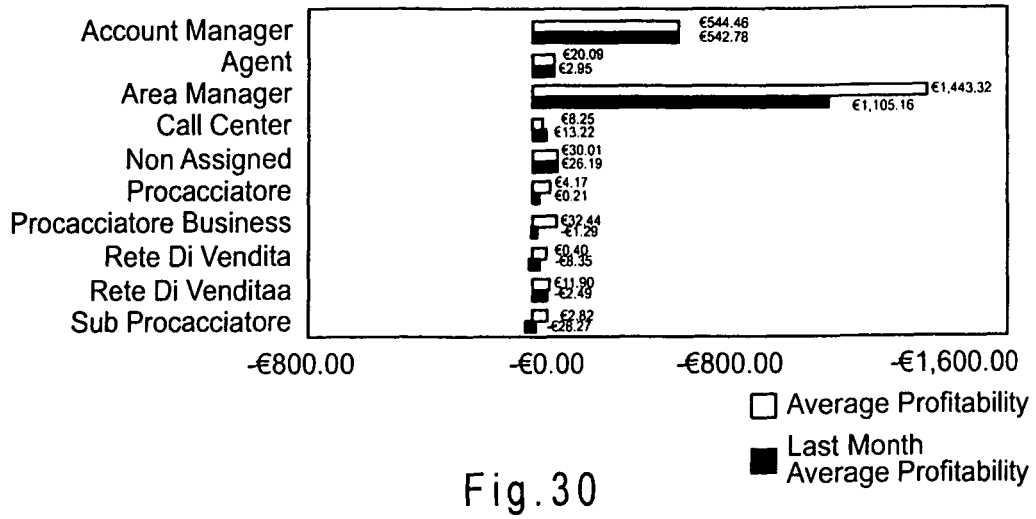
FIG. 30 is a sample report showing profitability by seller type, again with two consecutive months of data displayed.

FIG. 30 is a sample report showing profitability by seller type. Again two consecutive months are shown. According to the sample data, sales by Area Managers are the most profitable, followed by sales by account managers, and all other sellers.

Figure 31:
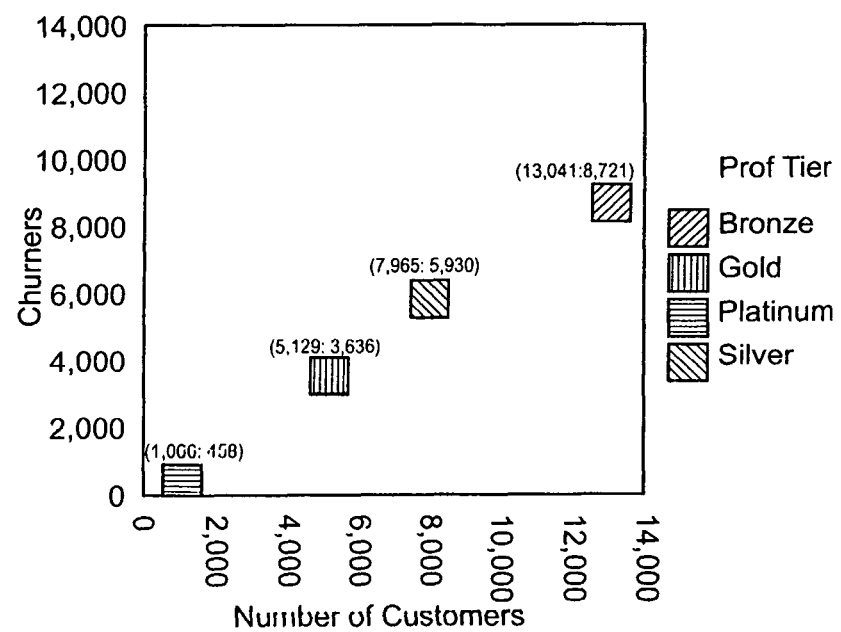
FIG. 31 is a sample report showing the number of churned customers versus the number of customers, by profitability tiers.

FIG. 31 is a sample report showing the number of churned customers (customers who have dropped the telecommunications service provider's services) versus the number of customers by profitability tiers. The chart shows a relatively linear relationship between the number of customers and the number of churners which is relatively unaffected by profitability tier.

Figure 32:
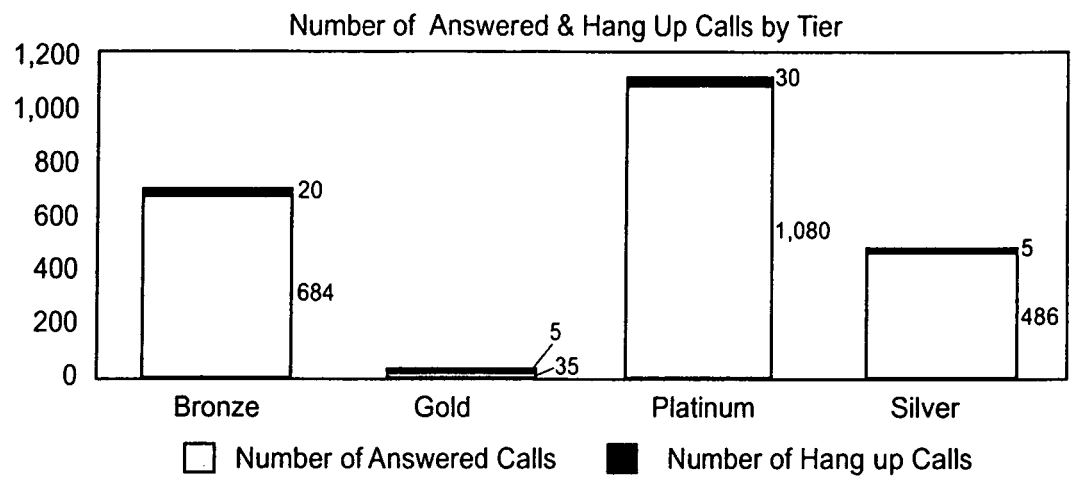
FIG. 32 is a sample report showing the number of answered calls from a marketing campaign and the number of hang ups, by profitability tier.

FIG. 32 is a sample report showing the number of answered calls from a marketing campaign and the number of hang ups, by profitability tier. As can be seen the most profitable customers, those classified as "Platinum" customers, were the most likely to answer a marketing call, but of the customers who answered, silver customers had the lowest percentage of hang ups.

Figure 33:
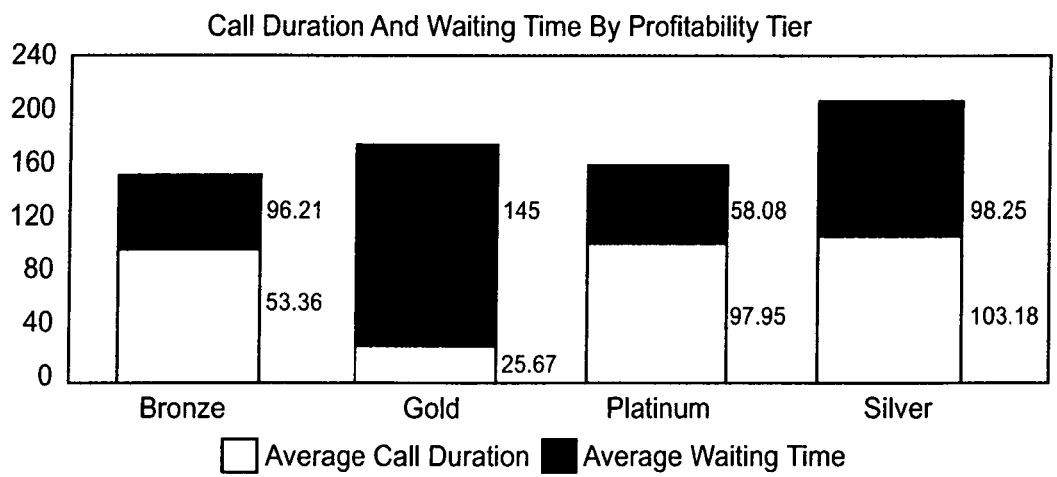
FIG. 33 is a sample report showing details of call center operations, including the average call center call duration, and the average waiting time by profitability tier.

FIG. 33 is a sample report showing details of call center operations. The report shows the average call center call duration, and the average waiting time by profitability tier. As can be seen, both Platinum and Gold customers, the most profitable customer segments, had longer waiting times than Bronze, the least profitable customers. This sample report would provide an indication of an area where customer service may be improved by concentrating efforts on more profitable customers.

Additional reports may be created as desired. For example, reports may be generated showing the highest profitability customers with no traffic for the previous month, or customers with the lowest profitability, and others.

The systems and methods of the invention, allow a business such as a telecommunications service provider to analyze virtually every aspect of customer profitability, comparing and contrasting all of the elements that contribute to profitability, and identifying characteristics and trends among its customer base that may otherwise go unnoticed. Using the analysis tools of the invention, a business may identify areas of strength and areas of weakness and direct resources accordingly either to maintain the areas of high profitability or increase their efforts in areas or customer segments where profitability lags.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:
1. A computer system comprising:
a database;
a data interface controlled by the computer system configured to:
retrieve an interface specification for one or more business operating systems from a UDDI registry;
alter the interface according to the interface specification for each of the one or more business operating systems;
receive customer data, revenue data and cost data;
store the customer data, revenue data and cost data in the database;
define the customer data, revenue data and cost data to extract from the one or more external business operating systems;
force the one or more external business operating systems to supply the customer data, revenue data and cost data in one or more specified formats, where the formats include a format consistent with storage and indexing requirements of the database; and
identify revenue data by a revenue source including revenue from an interaction between at least two customers, the cost data by a cost source, an activity type and a cost driver, wherein the interaction between the at least two customers represents revenue from an interconnection fee, wherein the data interface is adapted based on the interaction between the at least two customers and interconnection traffic related to the interaction between the at least two customers; and
implement one or more specified formats the one or more business operating systems must use to supply the customer data, revenue data and cost data, where the formats include a format consistent with storage and indexing requirements of the database;
a data transformation module including instructions, executed by the computer system, that allocate specific costs and revenue to individual customers according to allocation rules, and store transformed data in the database and on the computer;
a customer profitability module including instructions, executed by the computer system, to calculate a customer profitability value for the individual customers, based on the costs and revenue allocated to the individual customers;
a report module including instructions, executed by the computer system, operable to generate a report analyzing customer profitability on a per customer basis and illustrating a key performance indicator for customer profitability based on the customer profitability value for the individual customers,
wherein the report analyzing customer profitability on a per customer basis includes the key performance indicator,
wherein the report comprises pairings of two or more key performance indicators to demonstrate a correlation or lack thereof between the selected key performance indicators, and
wherein the report incorporates, in the report, customer data that distinguishes between various segments of the customer population such that the report includes the key performance indicators for a plurality of different customer segments; and a web services interface controlled by the computer system configured to:
retrieve an interface specification for one or more web service clients from a UDDI registry;
alter the web services interface according to the interface specification to enable each of the one or more web service clients to exchange information with the database;
retrieve profitability data from the database; and
distribute the profitability data to each of the one or more web service clients.

2. The computer system of claim 1 further comprising:
customer profitability information consumer computer systems, in communication through a network and the internet, including a customer relationship management system configured to:
define relationship management efforts by adjusting customer priority;
receive the customer profitability value; and
responsively modify the relationship management efforts based on the customer profitability value;
wherein the data interface is adapted to receive customer data from the customer relationship management system.

3. The computer system of claim 1 wherein the data interface is adapted to receive revenue data from a customer invoice/billing system.

4. The computer system of claim 1 wherein the transformation module employs activity based costing to allocate costs to individual customers.

5. The computer system of claim 1 further comprising a graphical user interface for interacting with the database.

6. The computer system of claim 5 wherein the graphical user interface is adapted to allow a user to create and modify key performance indicators for evaluating customer profitability, the key performance indicators generating values by which customer profitability may be measured and evaluated against other factors.

7. The computer system of claim 1 further comprising a customer lifetime value module for calculating an expected lifetime value of a customer over an expected relationship lifetime.

8. A method implemented in a business systems environment comprising:
interfacing a customer profitability data mart with business operating systems executed by a computer in communication with an internet through a data interface, wherein the data interface is implemented when the computer executes a data feeding module, including:
a customer billing system,
a customer relationship management system, and
accounting systems;
forcing the business operating systems to supply the customer, revenue and cost data in formats consistent with the storage and indexing requirements of the data mart;
receiving customer, revenue and cost data from the business operating systems, using the graphical user interface, in formats consistent with storage and indexing requirements of the data mart;
retrieving an interface specification for each of the business operating systems from a UDDI registry;
altering the interfacing of the customer profitability data mart to the business operating systems according to the interface specification for the respective business operating systems;
accessing data in the data mart using a graphical user interface in communication with the computer and the internet;
generating reports, using a report module comprising instructions executed by the computer, based on data stored in the data mart, wherein the reports include a report analyzing customer profitability on a per customer basis and illustrates a key performance indicator for the customer profitability based on a customer profitability value for individual customers;
including the key performance indicator in the report analyzing profitability on a per customer basis, wherein the report analyzing profitability on a per customer basis comprises pairings of two or more key performance indicators to demonstrate a correlation or lack thereof between the selected key performance indicators;
incorporating, in the report, customer data that distinguishes between various segments of the customer population such that the report includes the key performance indicators for a plurality of different customer segments;
analyzing, using the computer, a business's profitability on a per customer basis;
receiving customer, revenue and cost data from the business operating systems, using the graphical user interface, in formats consistent with storage and indexing requirements of the data mart;
identifying, using the computer and the graphical user interface, the revenue data by a revenue source including revenue from an interaction between at least two customers and the cost data by a cost source, an activity type and a cost driver, wherein the interaction between the at least two customers represents revenue from an interconnection fee, wherein altering the interfacing is based on the interaction between the at least two customers and interconnection traffic related to the interaction between the at least two customers;
storing, through the data interface, the received data in the data mart;
allocating, using the computer, revenue and cost data to individual customers according to allocation rules;
calculating, using the computer, customer profitability for individual customers from the revenue and cost data allocated to said individual customers;
interfacing the customer profitability data mart with one or more web service clients executed by the computer through a web services interface;
retrieving, using the web services interface, an interface specification for each of the one or more web service clients from a UDDI registry;
altering the interfacing of the profitability data mart with the one or more web service clients according to the interface specification to enable each of the one or more web service clients to exchange information with the profitability data mart;
retrieving, through the web services interface, profitability data from the profitability data mart;
distributing, through the web services interface, the profitability data to each of the one or more web service clients; and
modifying relationship management efforts, using the computer, based on the customer profitability by adjusting customer priority, wherein the customer relationship management system defines the relationship management efforts.

9. The method of claim 8 wherein said allocation rules comprise activity based costing rules wherein a number of cost incurring activities are defined and specific costs are associated with each activity, and wherein the cost associated with an activity is allocated to a specific customer when the activity is performed by a customer or in response to a customer.

10. The method of claim 8 wherein revenue data are received from the customer billing system, and wherein an amount billed to a customer is allocated as revenue to the customer.

11. The method of claim 8 further comprising calculating, using the computer, a key performance indicator derived from the customer, revenue and cost data received from the business operating systems interfaced with the data mart.

12. The method of claim 11 wherein the key performance indicator comprises one of:
average profitability;
costs from each identified cost source;
total costs;
average cost per user;
revenue from each identified revenue source;
total revenue;
average revenue per customer.

13. The method of claim 12 further comprises calculating, using the computer, additional key performance indicators configured by a user via the graphical user interface.

14. The method of claim 8 further comprising calculating, using the computer, the net present value of future profitability of a customer, future profitability being calculated based on present profitability multiplied by an expected duration of a relationship with the customers.

15. The method of claim 14 further comprising altering a parameter of the customer lifetime value calculation, using the graphical user interface, in order to determine how a change in the expected relationship with customer or group of customers will alter the customer lifetime profitability.

16. A method comprising:
identifying, through a graphical user interface accessing a computer and internet, sources of revenue and sources of costs, an activity type and a cost driver;
establishing rules, using the computer, for allocating revenue and costs to individual customers; receiving customer, revenue and cost data;
retrieving an interface specification for one or more business operating systems from a UDDI registry;
altering the interface according to the interface specification for each of the one or more business operating systems;
receiving, through a data interface, customer data, revenue data that identifies revenue from an interaction between at least two customers and cost data in a specified format forced by the data interface to be consistent with storage and indexing requirements of a database, wherein the data interface is implemented when the computer executes a data feeding module, wherein the interaction between the at least two customers represents revenue from an interconnection fee, wherein altering the data interface is adapted based on the interaction between the at least two customers and interconnection traffic related to the interaction between the at least two customers;
storing, through the data interface, the customer data, the revenue data and the cost data in the database;
allocating, using the computer, revenue and costs to individual customers according to said rules;
calculating, using the computer, a customer profitability value for each of the individual customers and a key performance indicator value derived from at least one of the cost data, the revenue data, and the customer profitability values; and
retrieving an interface specification for one or more web service clients from a UDDI registry;
altering a web services interface according to the interface specification for each of the one or more web service clients;
retrieving, through the web services interface, profitability data from the database;
distributing, through the web services interface, the profitability data to the web service clients;
generating, using the computer, a report displaying one of the customer profitability values and the key performance indicator value in the graphical user interface, wherein the report analyzes profitability on a per customer basis, wherein the report comprises pairings of two or more key performance indicators to demonstrate a correlation or lack thereof between the selected key performance indicators;
incorporating, in the report, customer data that distinguishes between various segments of the customer population such that the report includes the key performance indicators for a plurality of different customer segments; and
modifying relationship management efforts, using the computer, based on assigned customer priority according to the customer profitability values, wherein a customer relationship management system defines the relationship management efforts.

17. The method of claim 16 wherein the key performance indicator is selected, through the graphical user interface, from the group comprising:
the cost associated with an identified cost source;
total costs;
average cost per customer;
the revenue associated with an identified revenue source;
total revenue;
average revenue per customer;
total profitability; and
average profitability.

18. The method of claim 16 further comprising defining, through the graphical user interface, the various segments of the customer population including customer segments based on customer attributes and grouping customers sharing a common attribute in a common customer segment.

19. The method of claim 18 wherein the customer segments comprise profitability tiers, each tier defining a profitability range, customers having a customer profitability value that falls within the profitability range of a given tier being grouped in the given tier.

20. The method of claim 18 wherein the customer segments are defined by service use patterns, customers having similar use patterns being grouped in a common customer segment.

21. The method of claim 20 wherein customer segments are defined by various product types purchased by customers.

22. The method of claim 20 wherein customer segments are defined by various service types subscribed to by customers.

23. The method of claim 20 wherein the customer segments are defined by various customer types.

24. The method of claim 20 wherein generating one or more reports comprises displaying, in the graphical user interface, a first key performance indicator value for each of a plurality of customer segments of the two or more key performance indicators.

25. The method of claim 24 further comprising displaying, in the graphical user interface, a second key performance indicator value for each of a plurality of customer segments of the two or more key performance indicators.

26. The method of claim 18 further comprising:
- defining a group of customers based on a common attribute;
- calculating, using the computer, an average customer lifetime value for members of the group based on the profitability of customers in the group and an average expected duration of a relationship with a customer in the group.

27. The method of claim 26 wherein the customer lifetime value for an individual customer is the net present valued of the future profitability of the customer over an expected duration of a relationship with the customer.

* * * * *

UNITED STATES PATENT AND TRADEMARK OFFICE
CERTIFICATE OF CORRECTION

PATENT NO. : 8,428,997 B2  
APPLICATION NO. : 11/293025  
DATED : April 23, 2013  
INVENTOR(S) : Matteo Maga et al.

It is certified that error appears in the above-identified patent and that said Letters Patent is hereby corrected as shown below:

In the Specification

In column 9, line 17, after "not consider the effects" replace "fo" with --of--.

Signed and Sealed this
Twenty-third Day of July, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,428,997 B2 | Page 1 of 1 |
| APPLICATION NO. | : 11/293025 | |
| DATED | : April 23, 2013 | |
| INVENTOR(S) | : Maga et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1105 days.

Signed and Sealed this
Sixteenth Day of December, 2014

Michelle K. Lee
*Deputy Director of the United States Patent and Trademark Office*